US012632975B2

(12) United States Patent
Yamada et al.

(10) Patent No.: US 12,632,975 B2
(45) Date of Patent: May 19, 2026

(54) INFORMATION PROCESSING DEVICE, INFORMATION PROCESSING METHOD, AND PROGRAM

(71) Applicant: Sony Semiconductor Solutions Corporation, Kanagawa (JP)

(72) Inventors: Hideshi Yamada, Kanagawa (JP); Tatsuji Ashitani, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 263 days.

(21) Appl. No.: 18/551,076

(22) PCT Filed: Jan. 20, 2022

(86) PCT No.: PCT/JP2022/001919
§ 371 (c)(1),
(2) Date: Sep. 18, 2023

(87) PCT Pub. No.: WO2022/201804
PCT Pub. Date: Sep. 29, 2022

(65) Prior Publication Data
US 2024/0169572 A1 May 23, 2024

(30) Foreign Application Priority Data

Mar. 25, 2021 (JP) ................................. 2021-051918

(51) Int. Cl.
| *G06T 7/55* | (2017.01) |
| *G06T 7/521* | (2017.01) |
| *G06T 7/73* | (2017.01) |

(52) U.S. Cl.
CPC ................ *G06T 7/55* (2017.01); *G06T 7/521* (2017.01); *G06T 7/73* (2017.01); *G06T 2207/10028* (2013.01); *G06T 2207/20081* (2013.01)

(58) Field of Classification Search
CPC .. G06T 7/55; G06T 7/521; G06T 7/73; G06T 2207/10028; G06T 2207/20081
See application file for complete search history.

(56) References Cited

U.S. PATENT DOCUMENTS

| 10,373,362 B2 * | 8/2019 | Fine ........................ H04N 23/69 |
| 11,107,245 B2 * | 8/2021 | Kashiwagi .............. G06T 7/529 |

(Continued)

FOREIGN PATENT DOCUMENTS

| JP | 2014524016 A | 9/2014 |
| JP | 6656549 B1 | 3/2020 |

(Continued)

OTHER PUBLICATIONS

International Search Report (PCT/ISA/210), International Application No. PCT/JP2022/001919, dated Apr. 12, 2022.

*Primary Examiner* — Gregory M Desire
(74) *Attorney, Agent, or Firm* — Michael Best & Friedrich LLP

(57) ABSTRACT

The present disclosure relates to an information processing device, an information processing method, and a program capable of correcting a correction target pixel caused by a field of view of a sensor.
Provided is an information processing device including a processing unit that performs processing using a trained model trained by machine learning on at least a part of a first image in which a subject acquired by a first sensor is indicated by depth information, a second image in which the subject acquired by a second sensor is indicated by depth information, and a third image obtained from the first image and the second image to correct a correction target pixel included in any of the images. The present disclosure can be applied to, for example, a device having a plurality of depth sensors.

15 Claims, 16 Drawing Sheets

(56) References Cited

U.S. PATENT DOCUMENTS

| | | | | |
|---|---|---|---|---|
| 11,758,247 B2 * | 9/2023 | Azuma | ..................... | G06T 5/70 |
| | | | | 348/46 |
| 11,948,315 B2 * | 4/2024 | Ren | ..................... | H04N 23/698 |

FOREIGN PATENT DOCUMENTS

| | | | |
|---|---|---|---|
| JP | 2020153799 | A | 9/2020 |
| WO | WO-2012175731 | A1 | 12/2012 |
| WO | 2020041178 | A1 | 2/2020 |

* cited by examiner 11
(LS1,LS2)

*FIG. 15*

INFORMATION PROCESSING DEVICE, INFORMATION PROCESSING METHOD, AND PROGRAM

TECHNICAL FIELD

The present disclosure relates to an information processing device, an information processing method, and a program, and more particularly to an information processing device, an information processing method, and a program capable of correcting a correction target pixel caused by a field of view of a sensor.

BACKGROUND ART

There is a technology for generating a depth image of a wider angle by connecting depth images obtained by a plurality of depth sensors.

Patent Document 1 discloses a technology of detecting a defective pixel in depth measurement data, defining a depth correction of the detected defective pixel, and applying the depth correction to the depth measurement data of the detected defective pixel in order for depth map quality enhancement.

CITATION LIST

Patent Document

Patent Document 1: Japanese Translation of PCT Application No. 2014-524016

SUMMARY OF THE INVENTION

Problems to be Solved by the Invention

When various depth images are generated by arranging a plurality of depth sensors such that fields of view have a predetermined relationship, there is a case where a depth image to be processed includes a correction target pixel, such as a defective pixel, due to a field of view of a sensor, and it is required to correct the correction target pixel caused by the field of view of the sensor.

The present disclosure has been made in view of such circumstances, and enables correction of a correction target pixel caused by a field of view of a sensor.

Solution to Problems

An information processing device according to a first aspect of the present disclosure is an information processing device including a processing unit that performs processing using a trained model trained by machine learning on at least a part of a first image in which a subject acquired by a first sensor is indicated by depth information, a second image in which the subject acquired by a second sensor is indicated by depth information, and a third image obtained from the first image and the second image to correct a correction target pixel included in any of the images.

An information processing method and a program according to the first aspect of the present disclosure are an information processing method and a program adapted to the information processing device according to the first aspect of the present disclosure described above.

In the information processing device, the information processing method, and the program according to the first aspect of the present disclosure, the processing using the trained model trained by the machine learning is performed on at least a part of the first image in which the subject acquired by the first sensor is indicated by the depth information, the second image in which the subject acquired by the second sensor is indicated by the depth information, and the third image obtained from the first image and the second image, and the correction target pixel included in any one of the images is corrected.

An information processing device according to a second aspect of the present disclosure is an information processing device including a processing unit that performs processing using a trained model trained by machine learning on at least a part of an image indicating a subject, acquired by a sensor including a first light source and a second light source, by depth information, in which the first light source and the second light source are arranged such that irradiation regions of light overlap, and the processing unit identifies, as a pixel correction position, a position corresponding to an overlapping portion between the irradiation regions in the image, and corrects depth information of the pixel correction position using the trained model.

An information processing method and a program according to the second aspect of the present disclosure are an information processing method and a program adapted to the information processing device according to the second aspect of the present disclosure described above.

In the information processing device, the information processing method, and the program according to the second aspect of the present disclosure, the processing using the trained model trained by the machine learning is performed on at least a part of the image in which the subject, acquired by the sensor including the first light source and the second light source arranged such that the irradiation regions of light overlap, is indicated by the depth information, the position corresponding to the overlapping portion between the irradiation regions in the image is identified as the pixel correction position, and the depth information of the pixel correction position is corrected using the trained model.

Note that the information processing devices according to the first aspect and the second aspect of the present disclosure may be devices independent of each other or internal blocks constituting one device.

BRIEF DESCRIPTION OF DRAWINGS

FIG. 15 is a block diagram illustrating a configuration example of an optical sensor.

MODE FOR CARRYING OUT THE INVENTION

1. Embodiment of Present Disclosure (Configuration Example of Device)

Figure 1:
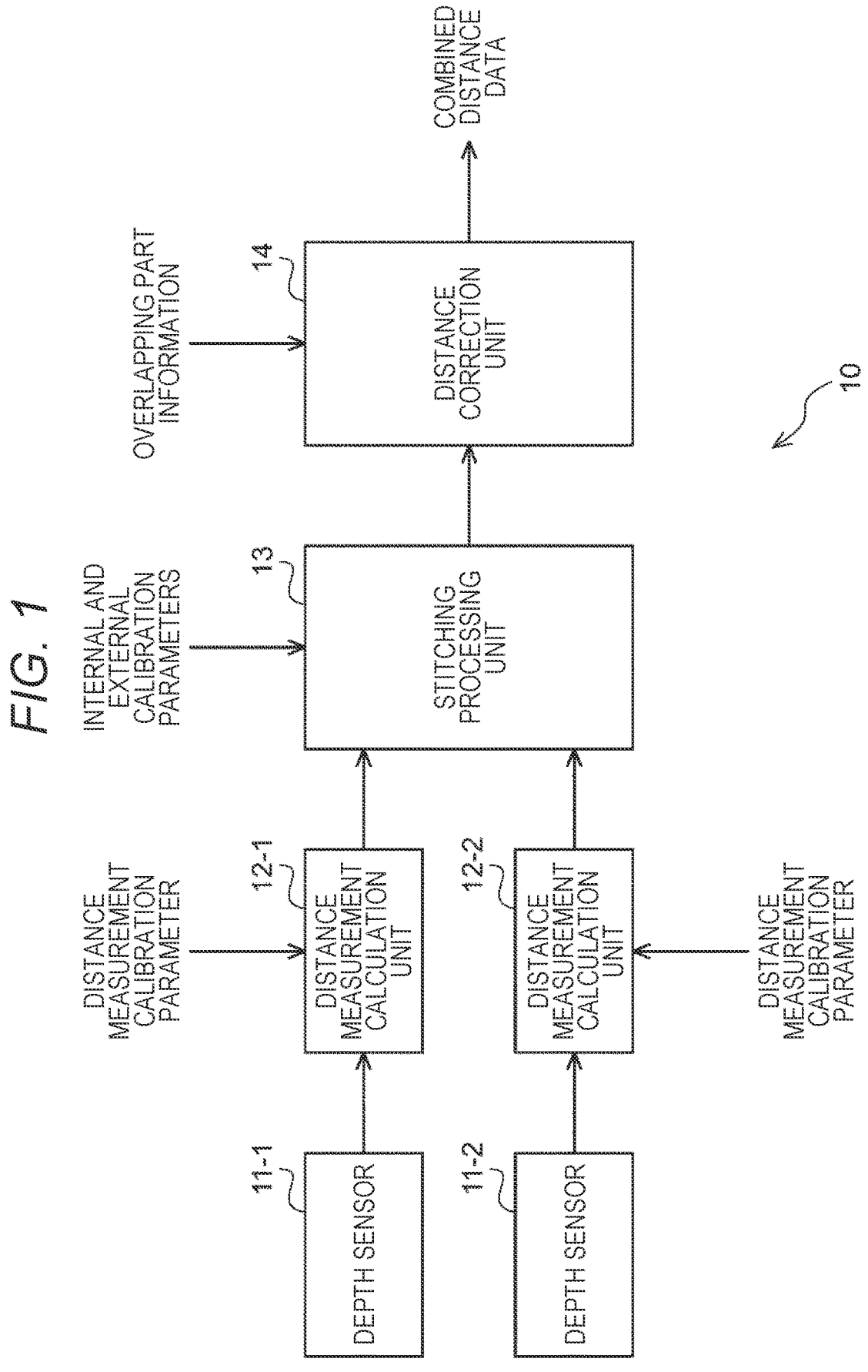
FIG. 1 is a diagram illustrating a configuration example of a distance measuring device to which the present disclosure is applied.

FIG. 1 is a diagram illustrating a configuration example of a distance measuring device to which the present disclosure is applied.

In FIG. 1, a distance measuring device 10 includes a depth sensor 11-1, a depth sensor 11-2, a distance measurement calculation unit 12-1, a distance measurement calculation unit 12-2, a stitching processing unit 13, and a distance correction unit 14. In the distance measuring device 10, the depth sensor 11-1 and the depth sensor 11-2 are arranged so as to have an overlap between fields of view (FoV).

The depth sensor 11-1 is a distance measuring sensor such as a ToF sensor. For example, the ToF sensor measures a time until light emitted from a light source is reflected by a subject and received by a light receiving element (light receiving unit) is measured, and a distance is calculated on the basis of a known speed of light. The ToF sensor may use either a direct time of flight (dToF) method or an indirect time of flight (iToF) method.

Note that, as the depth sensor 11-1, a structure light type sensor, a light detection and ranging (LiDAR) type sensor, a stereo camera, or the like may be used. The depth sensor 11-1 measures a subject and supplies RAW data obtained as a result to the distance measurement calculation unit 12-1.

The distance measurement calculation unit 12-1 performs a distance measurement calculation using the RAW data supplied from the depth sensor 11-1 on the basis of a distance measurement calibration parameter, and supplies distance data regarding the distance to the subject obtained as a result to the stitching processing unit 13. The distance measurement calculation unit 12-1 may be provided in the depth sensor 11-1.

The depth sensor 11-2 is a distance measuring sensor such as a ToF sensor. The depth sensor 11-2 measures a subject and supplies RAW data obtained as a result to the distance measurement calculation unit 12-2.

The distance measurement calculation unit 12-2 performs a distance measurement calculation using the RAW data supplied from the depth sensor 11-2 on the basis of distance measurement calibration parameters, and supplies distance data regarding the distance to the subject obtained as a result to the stitching processing unit 13. The distance measurement calculation unit 12-2 may be provided in the depth sensor 11-2.

The distance measurement calibration parameters include, for example, parameters related to offset, cyclic error, distortion, temperature correction, and the like. In the distance measurement calculation unit 12-1 and the distance measurement calculation unit 12-2, a necessary parameter among the distance measurement calibration parameters can be appropriately used.

The distance data from the distance measurement calculation unit 12-1 and the distance data from the distance measurement calculation unit 12-2 are supplied to the stitching processing unit 13. The stitching processing unit 13 performs combining processing of combining pieces of the distance data on the basis of internal and external calibration parameters, and supplies combined distance data obtained as a result to the distance correction unit 14.

For example, in the stitching processing unit 13, depth images obtained from signals of the respective depth sensors are supplied as the distance data, and processing of connecting these depth images is performed, so that a wide-angle depth image in which the two depth images are connected is generated as the combined distance data. The depth image is an image indicating the subject by depth information. The wide-angle depth image is a depth image having a wider angle than one depth image by connecting a plurality of depth images.

The internal and external calibration parameters include parameters related to lens distortion and the like used for internal calibration, and parameters related to a camera posture and the like used for external calibration. In the stitching processing unit 13, a necessary parameter among the internal and external calibration parameters can be appropriately used.

The distance correction unit 14 performs correction processing of correcting the combined distance data supplied from the stitching processing unit 13 on the basis of overlapping part information, and outputs the combined distance data after correction obtained as a result. The overlapping part information includes information such as a map of overlapping pixels. The distance correction unit 14 can appropriately use necessary information out of the information included in the overlapping part information. As the combined distance data after correction, data such as a point cloud is output.

When performing the correction processing, the distance correction unit 14 performs processing using a trained model (learning model) trained by machine learning on at least a part of the combined distance data, and corrects the combined distance data. For example, the distance correction unit 14 performs processing using a trained model (learning model) trained by machine learning on a wide-angle depth image having a defect, thereby generating a wide-angle depth image in which the defect has been corrected.

In the distance measuring device 10 configured as described above, two depth sensors of the depth sensor 11-1 and the depth sensor 11-2 are arranged so as to have the overlap between the fields of view (FoV), and two depth images obtained by measuring a subject are connected, whereby a depth image of a wider angle can be generated.

At this time, an overlap portion between the fields of view of the depth sensor 11-1 and the depth sensor 11-2 has the following influence, for example.

That is, when light from a light source of one depth sensor enters light from a light source of the other depth sensor, mutual interference between the light sources occurs, so that there is a possibility of having a bad influence. This is because the plurality of light sources increases the number of multipath patterns. Furthermore, there is a high possibility that a region of each of the depth images corresponding to the overlap portion between the fields of view, that is, an image edge is degraded due to lens distortion or insufficient correction thereof.

Since light is emitted from the respective light sources of the depth sensor 11-1 and the depth sensor 11-2, a depth value becomes an abnormal value in the overlap portion between the fields of view due to double exposure. Moreover, a confidence value becomes an abnormal value if light is emitted from the light source of one depth sensor from the middle in the middle of emission of light from the light source of the other depth sensor. The light receiving element (light receiving unit) in the depth sensor has a range in which light can be received, but saturation may occur beyond the range if light is simultaneously emitted from the depth sensor 11-1 and the depth sensor 11-2.

Figure 2:
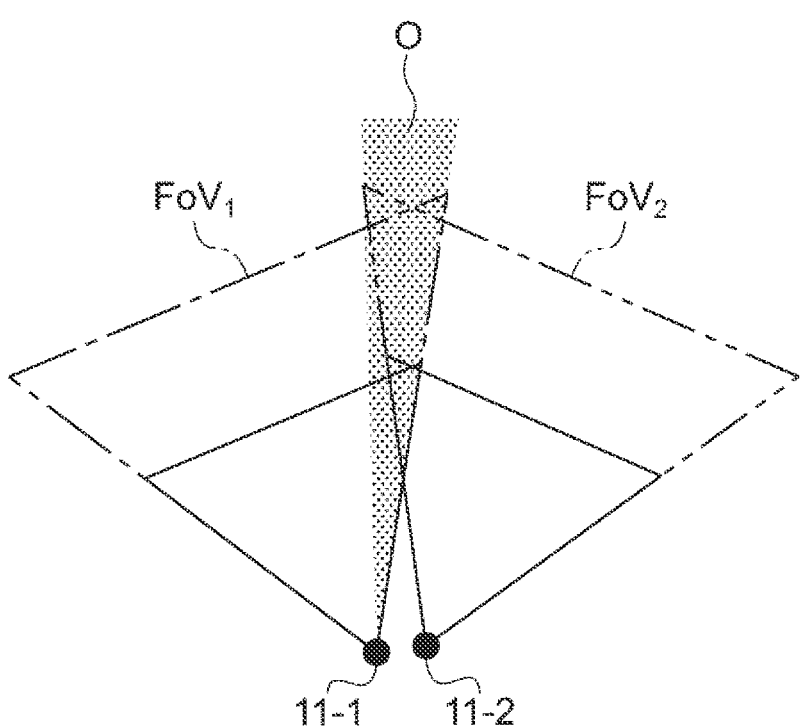
FIG. 2 is a view for describing correction of an overlapping portion between fields of view of two depth sensors.

FIG. 2 illustrates an overlapping portion of the field of view of the depth sensor 11-1 with respect to the field of view of the depth sensor 11-2. In FIG. 2, a field of view $FoV_1$ of the depth sensor 11-1 is indicated by a one-dot chain line, a field of view $FoV_2$ of the depth sensor 11-2 is indicated by a two-dot chain line, and an overlapping portion O of the field of view $FoV_2$ with respect to the field of view $FoV_1$ is indicated by a pattern of dots.

As described above, in the overlapping portion O, there are various influences on depth images due to the emission of light from each of the light sources of the two depth sensors of the depth sensor 11-1 and the depth sensor 11-2, the degradation of image edges of the depth images obtained from the respective depth sensors, and the like.

Therefore, in the technology according to the present disclosure, a wide-angle depth image having a defect due to such an overlapping portion between the fields of view is corrected to obtain a wide-angle depth image having no defect. When the wide-angle depth image having the defect is to be corrected, the processing using the trained model (learning model) trained by machine learning is performed on at least a part of the wide-angle depth image.

(Processing Using Learning Model)

Figure 3:
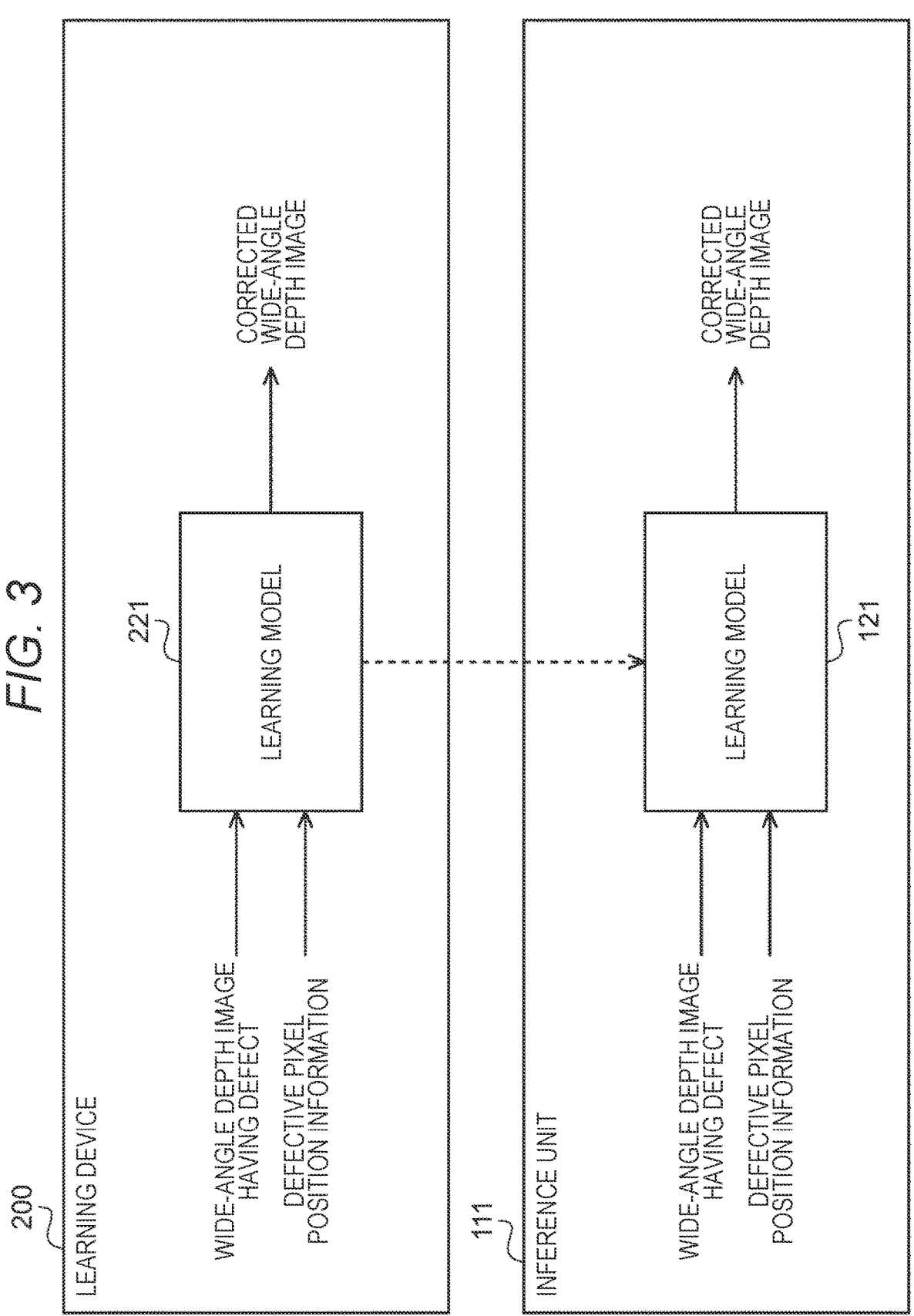
FIG. 3 is a diagram illustrating configuration examples of a learning device and an inference unit in a case where supervised learning is used.

In the distance correction unit 14 of FIG. 1, the processing using the trained model (learning model) is performed on at least a part of the wide-angle depth image having the defect. FIG. 3 illustrates configuration examples of a learning device that performs processing at the time of learning and an inference unit that performs processing at the time of inference in a case where supervised learning is used.

In FIG. 3, a learning device 200 that performs processing at the time of learning is illustrated in the upper part, and an inference unit 111 that performs processing at the time of inference is illustrated in the lower part. The inference unit 111 is included in the distance correction unit 14 of FIG. 1.

In FIG. 3, the learning device 200 includes a learning model 221. The learning model 221 is a model that performs machine learning by a neural network (NN) which receives a wide-angle depth image having a defect in a depth value and pixel position information (defective pixel position information) indicating a position of such a defective pixel as inputs and outputs a wide-angle depth image.

For example, in the learning model 221, learning in which the wide-angle depth image having the defect in the depth value and the pixel position information (defective pixel position information) indicating the position of the defective pixel are used as learning data and information regarding correction of (a region including) the defective pixel position is used as supervised data is repeated so that the wide-angle depth image in which the defect has been corrected can be output as an output thereof. For example, the wide-angle depth image in which the defect has been corrected is a wide-angle depth image in which a defect caused by the overlapping portion between the fields of view of the two depth sensors has been corrected. As the neural network, for example, a deep neural network (DNN), an auto encoder, or the like can be used.

The learning model 221 trained by machine learning at the time of learning in this manner can be used at the time of inference as the trained model.

In FIG. 3, the inference unit 111 includes a learning model 121. The learning model 121 corresponds to the learning model 221 that has been trained by performing the learning using machine learning at the time of learning.

The learning model 121 performs inference using a wide-angle depth image having a defect in a depth value and defective pixel position information as inputs to output a wide-angle depth image in which the defect has been corrected. Here, the wide-angle depth image having the defect in the depth value is a wide-angle depth image generated by connecting two depth images as measurement data obtained by the two depth sensors of the depth sensor 11-1 and the depth sensor 11-2. That is, the defect of the wide-angle depth image is caused by the overlapping portion between the fields of view of the two depth sensors. Furthermore, the defective pixel position information is information regarding a position of a defective pixel identified from the wide-angle depth image.

Note that other machine learning may be performed as the supervised learning. For example, at the time of learning, the learning may be performed such that information regarding a pixel position in which a defect has been corrected is output as an output of the learning model 221, and, at the time of inference, the learning model 121 may perform inference using a wide-angle depth image having a defect in a depth value and defective pixel position information as inputs and output information regarding a pixel position in which a defect has been corrected.

Furthermore, a learning model may be generated by unsupervised learning. For example, a learning model, which performs machine learning by a neural network using a wide-angle depth image having no defect as an input, is used, and the learning model repeats unsupervised learning without knowing a wide-angle depth image having a defect, thereby outputting a wide-angle depth image in which a defect has disappeared as an output. The learning model trained by the unsupervised learning in this manner is used at the time of inference to perform inference using a wide-angle depth image having a defect in a depth value as an input, so that it is possible to output a wide-angle depth image in which the defect has been corrected.

(Correction Processing)

Next, a flow of the correction processing in the distance correction unit 14 will be described with reference to a flowchart of FIG. 4.

In step S101, the stitching processing unit 13 generates a wide-angle depth image by connecting two depth images.

In step S102, the distance correction unit 14 determines whether or not all of D pixels included in the wide-angle depth image have been processed. Here, pixels included in the wide-angle depth image are referred to as the D pixels.

In a case where it is determined in step S102 that not all the D pixels have been processed, the processing proceeds to step S103. In step S103, the distance correction unit 14 acquires a depth value and a pixel position (x, y) for a D pixel to be processed.

In step S104, the distance correction unit 14 determines whether the acquired depth value of the D pixel to be processed is a valid depth value.

In a case where it is determined in step S104 that the depth value of the D pixel to be processed is not a valid depth value, the processing proceeds to step S105. In step S105, the distance correction unit 14 acquires the pixel position (x, y) of the D pixel whose depth value is not valid as a pixel correction position (x, y).

When the processing in step S105 ends, the processing returns to step S102. Furthermore, in a case where it is determined in step S104 that the depth value of the D pixel to be processed is a valid depth value, the processing in step S105 is skipped, and the processing returns to step S102.

The above-described processing is repeated, and the processing proceeds to step S106 in a case where it is determined in step S102 that all the D pixels have been processed. That is, when all the D pixels have been processed, all the pixel positions (x, y) of the D pixels whose depth values are not normal due to the overlapping portion between the fields of view of the two depth sensors in the wide-angle depth image are identified as the pixel correction positions (x, y).

In step S106, the distance correction unit 14 determines whether or not there is a depth value that needs to be corrected in the wide-angle depth image.

In a case where it is determined in step S106 that there is a depth value that needs to be corrected in the wide-angle depth image, the processing proceeds to step S107. Here, when the pixel correction position (x, y) of the D pixel having an abnormal depth value has been identified by repeating the processing from steps S102 to S105, it is determined that there is a depth value that needs to be corrected.

In step S107, the distance correction unit 14 generates pixel correction position information on the basis of the pixel correction position (x, y) of the D pixel having the abnormal depth value. The pixel correction position information includes information (coordinate (x, y)) for identifying a pixel position of the D pixel whose depth value needs to be corrected as a pixel (defective pixel) that needs to be corrected.

In step S108, the inference unit 111 (FIG. 3) of the distance correction unit 14 uses the learning model 121 to perform inference using the wide-angle depth image having the defect in the depth value and the pixel correction position information as inputs, and generates a wide-angle depth image in which the defect has been corrected. The learning model 121 is a trained model that has been subjected to learning by a neural network using a wide-angle depth image having a defect in a depth value and defective pixel position information as inputs at the time of learning, and can output a wide-angle depth image in which the defect has been corrected.

Note that the case of using the learning model 121 (FIG. 3) has been described here, but another trained model such as a learning model that performs inference using a wide-angle depth image having a defect in a depth value as an input and outputs a wide-angle depth image in which the defect has been corrected may be used.

When the processing in step S108 ends, a series of processing ends. Furthermore, in a case where it is determined in step S106 that there is no depth value that needs to be corrected in the wide-angle depth image, the wide-angle depth image having no defect (a complete wide-angle depth image) is generated and does not need to be corrected, and thus, the processing in steps S107 and S108 is skipped, and the series of processing ends.

The flow of the correction processing has been described above. In this correction processing, the pixel position (pixel correction position) of the D pixel having the abnormal depth value in the wide-angle depth image having the defect in the depth value due to the overlapping portion between the fields of view of the two depth sensors is identified, and the wide-angle depth image having the defect is corrected by performing the inference using the learning model 121 with the wide-angle depth image having the defect in the depth value and the pixel correction position information as inputs. Therefore, a region having the defect corresponding to the overlapping portion between the fields of view of the two depth sensors is corrected in the wide-angle depth image obtained by connecting the two depth images.

(Correction of Gap Portion)

Although the case of correcting the wide-angle depth image having the region corresponding to the overlapping portion in the case where the fields of view of the two depth sensors overlap has been described in the above description, in a case where the fields of view do not overlap (the fields of view are separated) between the depth sensor 11-1 and the depth sensor 11-2, a region corresponding to a gap portion between two depth images obtained from the respective depth sensors may be corrected.

Figure 5:
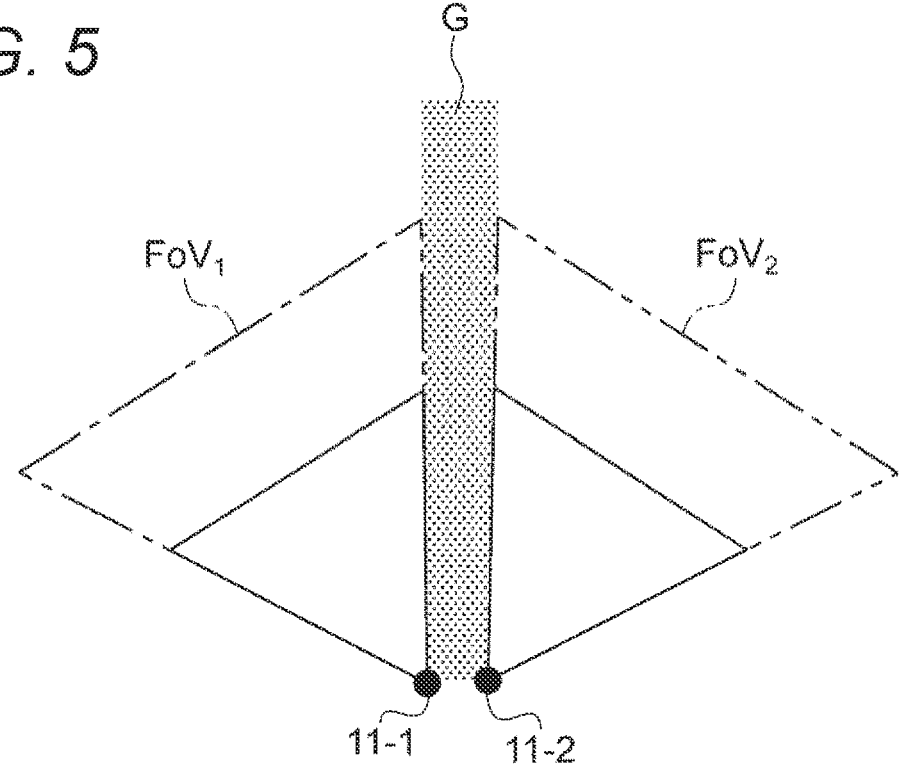
FIG. 5 is a view for describing correction of a gap portion between fields of view of two depth sensors.

FIG. 5 illustrates the gap portion between the field of view of the depth sensor 11-1 and the field of view of the depth sensor 11-2. In FIG. 5, the field of view $FoV_1$ of the depth sensor 11-1 is indicated by a one-dot chain line, the field of view $FoV_2$ of the depth sensor 11-2 is indicated by a two-dot chain line, and a gap portion G between the field of view $FoV_1$ and the field of view $FoV_2$ is indicated by a pattern of dots.

In this case, in a case where a wide-angle depth image has been generated by combining two depth images obtained from the respective depth sensors, the wide-angle depth image having a defect in a depth value due to the gap portion G between the fields of view of the two depth sensors is generated. Therefore, in the technology according to the present disclosure, the wide-angle depth image having the defect due to such a gap portion between the fields of view is corrected to obtain a wide-angle depth image having no defect. Here, when the wide-angle depth image having the defect is to be corrected, t processing using a trained model (learning model) trained by machine learning is performed on at least a part of the wide-angle depth image.

Figure 4:
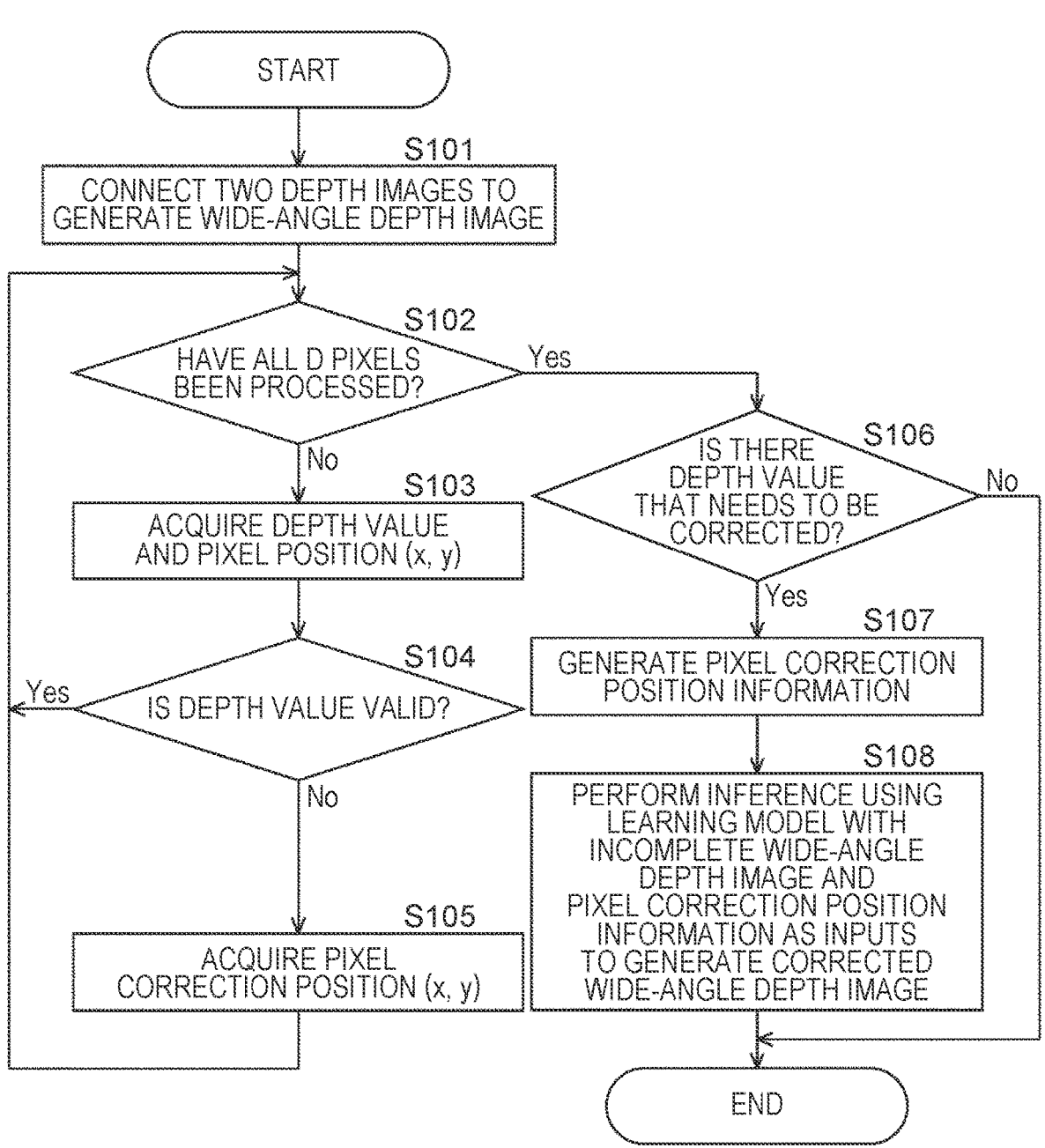
FIG. 4 is a flowchart describing an example of a flow of correction processing.

As correction processing here, processing similar to the correction processing illustrated in FIG. 4 is performed. That is, the case where the pixel position (x, y) of the D pixel having the abnormal depth value due to the overlapping portion between the fields of view of the two depth sensors is identified as the pixel correction position (x, y) has been described in the correction processing illustrated in FIG. 4, but a pixel position (x, y) of a D pixel to which no depth value is allocated due to the gap portion between the fields of view of the two depth sensors is identified here.

Then, inference using a learning model is performed with a wide-angle depth image having a defect in a depth value and pixel correction position information as inputs, so that the wide-angle depth image having the defect is corrected. Therefore, the region corresponding to the gap portion between the fields of view of the two depth sensors is corrected in the wide-angle depth image having the defect. The learning model used here is a trained model, configured to output a wide-angle depth image in which a defect in a depth value caused by a gap portion between fields of view has been corrected by learning using a wide-angle depth image having a defect in a depth value and pixel correction position information as inputs, and is trained so as to analogize a region corresponding to a gap portion from a plurality of depth images having different fields of view, for example.

As described above, even in the case where there is no overlap between the fields of view of the depth sensor 11-1 and the depth sensor 11-2, it is possible to generate a wide-angle depth image having no defect (wide-angle depth image in which a connecting portion has been interpolated). Furthermore, since there is no overlap between the fields of view of the two depth sensors, each of the depth sensors can avoid the saturation beyond the range in which the light receiving element can receive light. Moreover, in a case where there is an overlapping portion between the fields of view of the two depth sensors, a region other than the overlapping portion is darkly illuminated since each of the light sources is set so as not to exceed the limit in the overlapping portion for the purpose of eye safe. However, in a case where there is a gap portion in the fields of view of the two depth sensors, such a restriction on the light source is unnecessary, and it is possible to avoid that some regions are darkly illuminated.

(Correction of Overlapping Portion Between Different Fields of View)

The case where the fields of view of the two depth sensors overlap at edges (a boundary region) has been described in the above description, but, in a case where fields of view of two depth sensors having different fields of view, such as a wide angle and a telephoto, are arranged to overlap each other, a depth image having a defect due to an overlapping portion between the fields of view of these depth sensors may be corrected.

Figure 6:
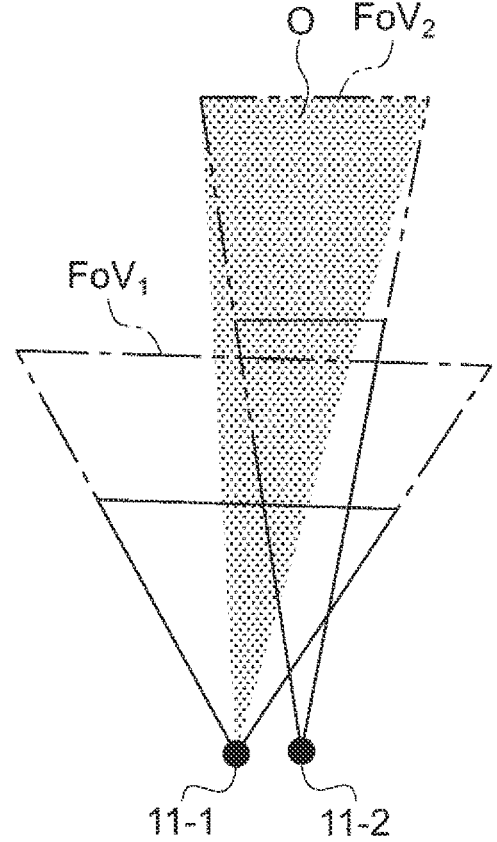
FIG. 6 is a view for describing correction of an overlapping portion between fields of view of two depth sensors having different fields of view.

FIG. 6 illustrates an overlapping portion between a field of view of the depth sensor 11-1 on a wide-angle side and a field of view of the depth sensor 11-2 on a telephoto side. In FIG. 6, the field of view $FoV_1$ of the depth sensor 11-1 on the wide-angle side is indicated by a one-dot chain line, the field of view $FoV_2$ of the depth sensor 11-2 on the telephoto side is indicated by a two-dot chain line, and the overlapping portion O of the field of view $FoV_2$ with respect to the field of view $FoV_1$ is indicated by a pattern of dots.

In this case, in a case where a depth image has been newly generated by combining two depth images obtained from the respective depth sensors, there is a possibility that the depth image has a defect in a depth value due to the overlapping portion O between the fields of view of the two depth sensors. That is, in the overlapping portion O, double exposure is performed by the light sources of the respective depth sensors so that the depth value may become an abnormal value. Therefore, in the technology according to the present disclosure, the depth image having the defect caused by such an overlapping portion between the fields of view of the depth sensors is corrected to obtain a depth image having no defect.

Here, when the depth image having the defect in the depth value is to be corrected, processing using a trained model (learning model) trained by machine learning is performed on at least a part of the depth image similarly to the above description. Here, as the learning model, it is possible to use a trained model configured to output a depth image in which a defect in a depth value caused by an overlapping portion between fields of view has been corrected by learning using a depth image having a defect in a depth value and pixel correction position information as inputs.

As described above, even in a case where the depth sensor 11-1 and the depth sensor 11-2 have different fields of view, such as a wide angle and a telephoto, and are arranged such that these fields of view overlap, it is possible to generate the depth image having no defect. For example, in a case where depth sensors adapted to the wide angle and the telephoto are combined, a depth distance measurement range (distance measurement range in a direction from the front to the back as viewed from the device) can be expanded by performing correction processing using a learning model on a part of a depth image obtained by combining depth images from the depth sensors and generating a depth image having no defect.

(Correction of Overlapping Portion in Case of Including Plurality of Light Sources)

Even in a case where one depth sensor includes a plurality of light sources and is arranged such that irradiation regions of light by the plurality of light sources overlap, a depth image having a defect caused by an overlapping portion between the irradiation regions of the light sources is assumed.

Figure 7:
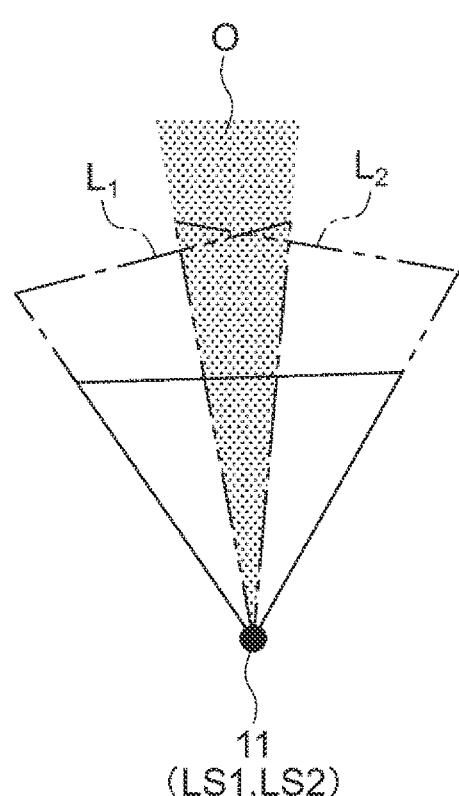
FIG. 7 is a view for describing correction of an overlapping portion between irradiation regions of a plurality of light sources included in one depth sensor.

FIG. 7 illustrates an overlapping portion between a light irradiation region by a light source LS1 and a light irradiation region by a light source LS2 in a case where two light sources of the light source LS1 and the light source LS2 are provided for one depth sensor 11. In FIG. 7, light $L_1$ emitted from the light source LS1 is indicated by a one-dot chain line, light $L_2$ emitted from the light source LS2 is indicated by a two-dot chain line, and the overlapping portion O between the irradiation regions of the light source LS1 and the light source LS2 is indicated by a pattern of dots. The light irradiation region by the light source is, so to speak, a region corresponding to a field of view of the light source, and, it can be said that a field of view of the light source LS1 and a field of view of the light source LS2 overlap in FIG. 7.

In this case, when the depth sensor 11 generates depth images, there is a possibility that a depth image having a defect in a depth value is generated due to the overlapping portion O between the irradiation regions of the two light sources. Therefore, in the technology according to the present disclosure, the depth image having the defect due to such an overlapping portion between the irradiation regions of the light sources is corrected to obtain a depth image having no defect. Here, when the depth image having the defect is to be corrected, processing using a trained model (learning model) trained by machine learning is performed on at least a part of the depth image similarly to the above description.

Here, when applied to the processing of the flowchart of FIG. 4, specifically, it is sufficient to perform the processing from step S102 on one depth image (wide-angle depth image) acquired by one depth sensor 11 without performing the connection processing in step S101. Meanwhile, as the learning model used in the inference processing in step S108, it is possible to use a trained model configured to output a depth image in which a defect in a depth value caused by an overlap between irradiation regions of the light sources has been corrected by learning using a depth image having a defect in a depth value and pixel correction position information as inputs.

2. Modified Examples

Other Configuration Examples

Although the distance correction unit 14 performs the correction processing on the wide-angle depth image as the combined distance data using the learning model 121 has been illustrated in the configuration illustrated in FIG. 1, processing using a trained model (learning model) trained by machine learning can be performed in at least some processing of a process including distance measurement calculation processing, stitching processing, and distance correction processing.

(A) First Configuration Example

Figure 8:
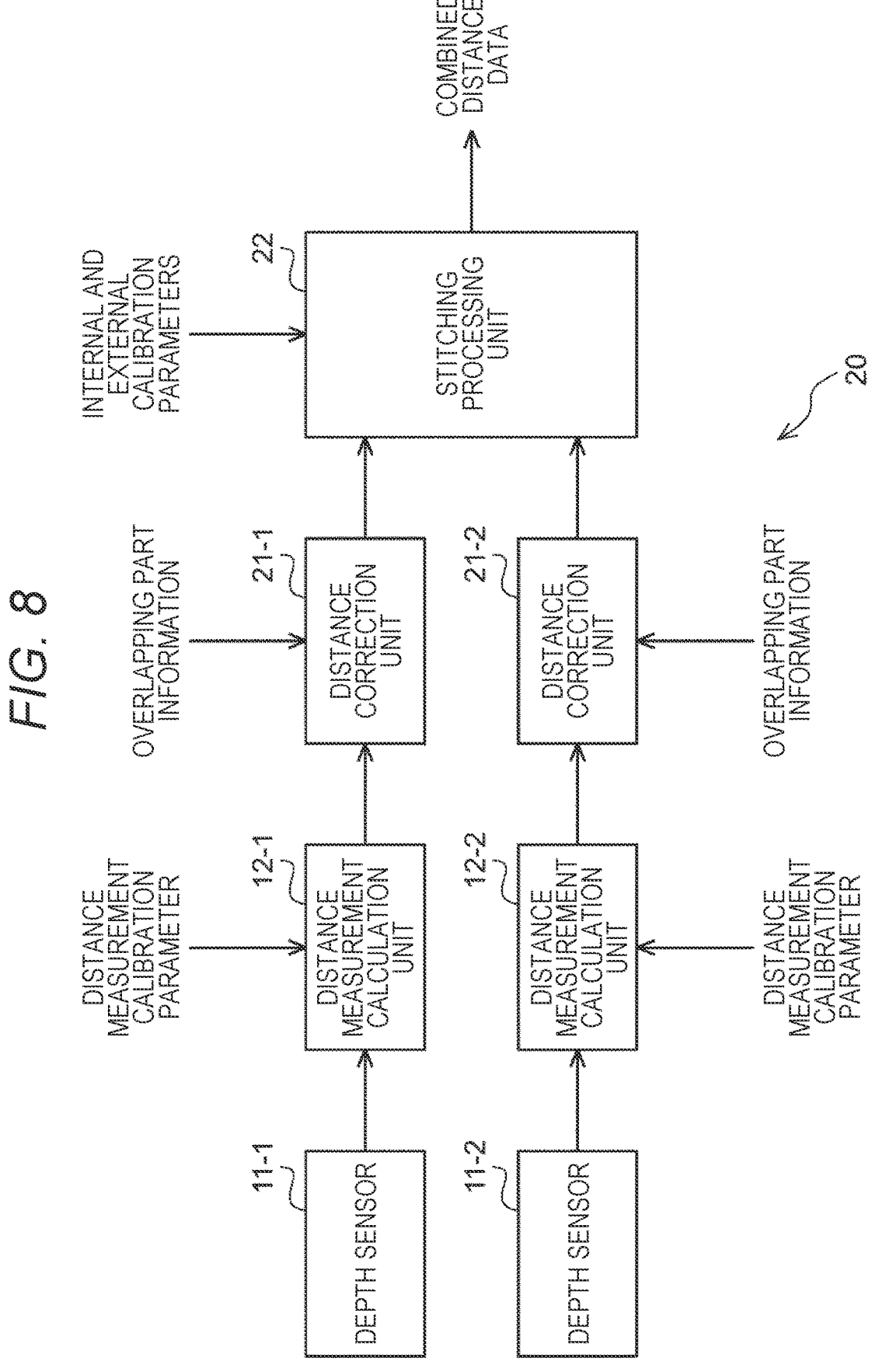
FIG. 8 is a diagram illustrating a first example of another configuration of a distance measuring device to which the present disclosure is applied.

FIG. 8 illustrates a configuration example in a case where correction processing is performed on two depth images using a learning model.

In FIG. 8, a distance measuring device 20 is provided with a distance correction unit 21-1, a distance correction unit 21-2, and a stitching processing unit 22 instead of the stitching processing unit 13 and the distance correction unit 14 as compared with the distance measuring device 10 in FIG. 1. Note that, in FIG. 8, sites corresponding to those in FIG. 1 are denoted by the same reference signs, and the description thereof is omitted.

The distance correction unit 21-1 performs correction processing of correcting distance data supplied from the distance measurement calculation unit 12-1 on the basis of overlapping part information, and supplies corrected distance data obtained as a result to the stitching processing unit 22. That is, when correcting the depth image as the distance data (correcting the overlap portion), the distance correction unit 21-1 performs inference using the learning model with a depth image having a defect in a depth value and pixel correction position information as inputs, and generates a depth image in which the defect has been corrected.

The distance correction unit 21-2 performs correction processing of correcting distance data supplied from the distance measurement calculation unit 12-2 on the basis of overlapping part information, and supplies corrected distance data obtained as a result to the stitching processing unit 22. In the distance correction unit 21-2, a depth image in which the defect has been corrected is generated using the learning model similarly to the distance correction unit 21-1.

The corrected distance data from the distance correction unit 21-1 and the corrected distance data from the distance correction unit 21-2 are supplied to the stitching processing unit 22. The stitching processing unit 22 performs combining processing of combining pieces of the corrected distance data on the basis of internal and external calibration parameters, and outputs combined distance data obtained as a result. That is, the stitching processing unit 22 performs processing of connecting two corrected depth images supplied as pieces of the corrected distance data, and generates a wide-angle depth image having no defect.

The correction processing performed by the distance correction unit 21-1 and the distance correction unit 21-2 is as follows when applied to the processing of the flowchart of FIG. 4 described above. That is, it is sufficient to perform the processing from step S102 on each of the two depth images without performing the connection processing in step S101. Meanwhile, the learning model used in the inference processing in step S108 is the trained model obtained by repeating learning using depth images having defects in depth values and pixel correction position information as inputs at the time of learning, and can output a depth image in which a defect in a depth value caused by an overlapping portion, a gap portion, or the like between fields of view has been corrected. Then, the two corrected depth images are combined to generate the wide-angle depth image.

(B) Second Configuration Example

Figure 9:
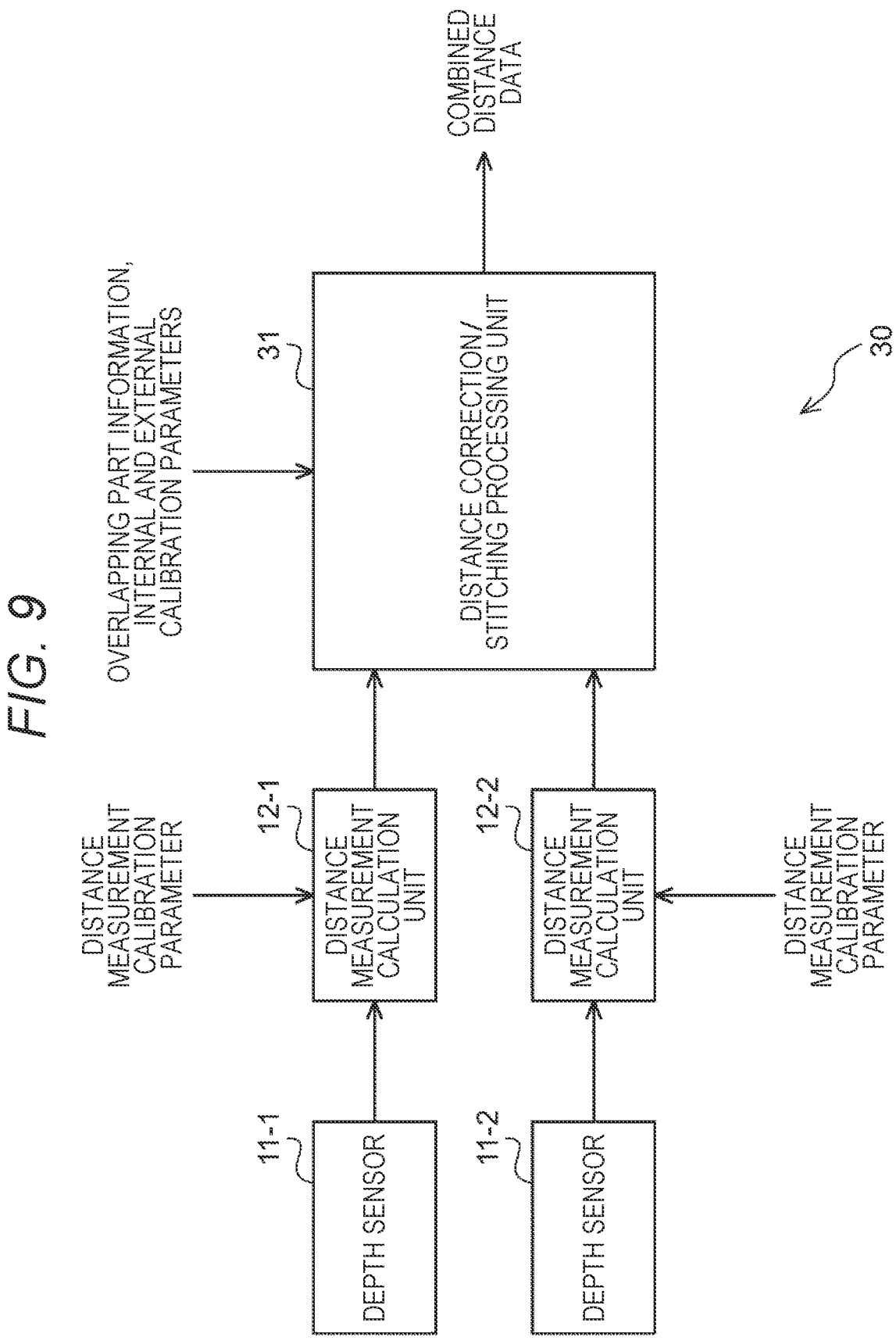
FIG. 9 is a diagram illustrating a second example of still another configuration of a distance measuring device to which the present disclosure is applied.

FIG. 9 illustrates a configuration in a case where distance correction processing and stitching processing are integrally performed using a learning model.

In FIG. 9, a distance measuring device 30 is provided with a distance correction/stitching processing unit 31 instead of the stitching processing unit 13 and the distance correction unit 14 as compared with the distance measuring device 10 in FIG. 1. Note that, in FIG. 9, sites corresponding to those in FIG. 1 are denoted by the same reference signs, and the description thereof is omitted.

Distance data from the distance measurement calculation unit 12-1 and distance data from the distance measurement calculation unit 12-2 are supplied to the distance correction/stitching processing unit 31. The distance correction/stitching processing unit 31 performs processing of generating combined distance data in which a defect has been corrected from the two pieces of distance data on the basis of overlapping part information and internal and external calibration parameters, and outputs the combined distance data obtained as a result.

That is, when generating a corrected wide-angle depth image as the combined distance data, the distance correction/stitching processing unit 31 generates the corrected wide-angle depth image by performing inference using the learning model with two depth images as inputs. The learning model used for this inference processing is, for example, a trained model obtained by repeating learning using depth images having defects in depth values and the like as inputs at the time of learning, and can output a wide-angle depth image in which a defect in a depth value caused by an overlapping portion, a gap portion, or the like between fields of view has been corrected.

(C) Third Configuration

Figure 10:
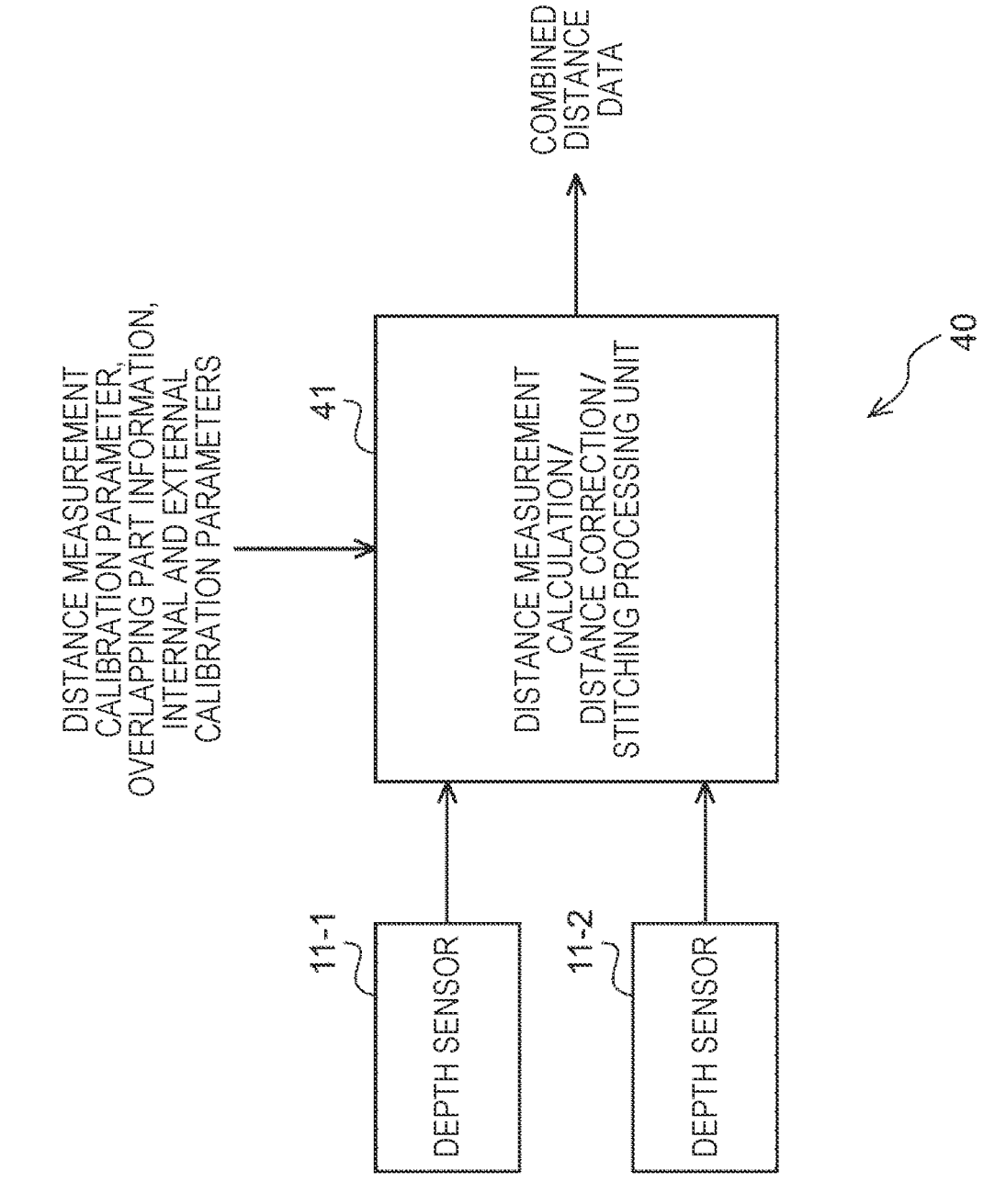
FIG. 10 is a diagram illustrating a third example of still another configuration of a distance measuring device to which the present disclosure is applied.

FIG. 10 illustrates a configuration in a case where distance measurement calculation processing, distance correction processing, and stitching processing are integrally performed using a learning model.

In FIG. 10, a distance measuring device 40 is provided with a distance measuring operation/distance correction/stitching processing unit 41 instead of the distance measurement calculation unit 12-1, the distance measurement calculation unit 12-2, the stitching processing unit 13, and the distance correction unit 14 as compared with the distance measuring device 10 in FIG. 1. Note that, in FIG. 10, sites corresponding to those in FIG. 1 are denoted by the same reference signs, and the description thereof is omitted.

RAW data from the depth sensor 11-1 and RAW data from the depth sensor 11-2 are supplied to the distance measurement calculation/distance correction/stitching processing unit 41. The distance measurement calculation/distance correction/stitching processing unit 41 performs processing of generating combined distance data in which a defect has been corrected from the two pieces of RAW data on the basis of a distance measurement calibration parameter, overlapping part information, and internal and external calibration parameters, and outputs the combined distance data obtained as a result.

That is, when generating a corrected wide-angle depth image as the combined distance data, the distance measurement calculation/distance correction/stitching processing unit 41 generates the corrected wide-angle depth image by performing inference using the learning model with the two pieces of RAW data as inputs. The learning model used for this inference processing is, for example, a trained model obtained by repeating learning using pieces of RAW data having defects and the like as inputs at the time of learning, and can output a wide-angle depth image in which a defect in a depth value caused by an overlapping portion, a gap portion, or the like between fields of view has been corrected.

Still Another Configuration Example

Figure 11:
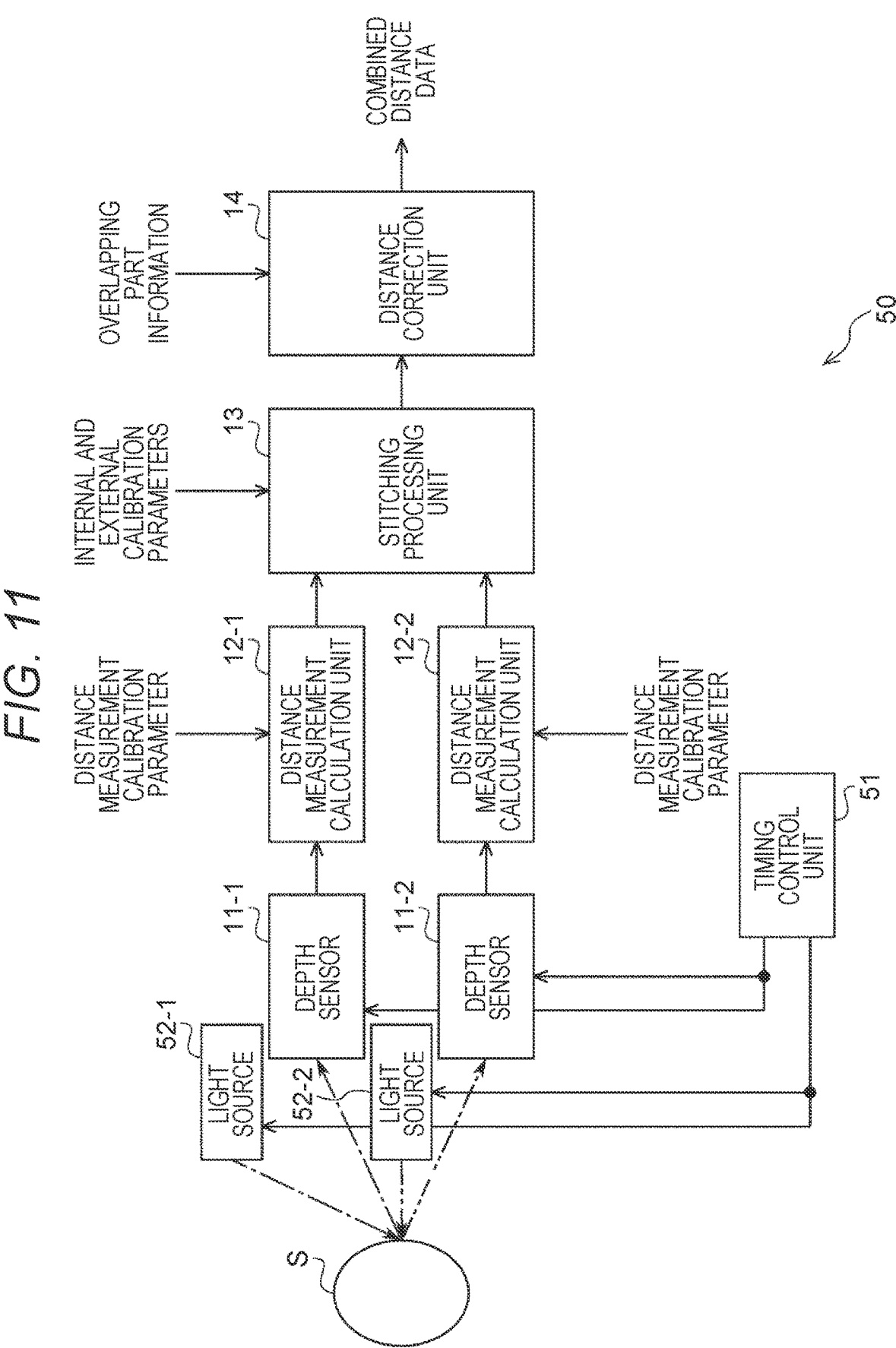
FIG. 11 is a diagram illustrating a fourth example of still another configuration of a distance measuring device to which the present disclosure is applied.

FIG. 11 illustrates a configuration example in a case where a light source and a light receiving element are synchronized in a case where a depth sensor includes the light source.

In FIG. 11, a timing control unit 51 is newly added to a distance measuring device 50 as compared with the distance measuring device 10 in FIG. 1. Furthermore, out of a light source and a light receiving element in the depth sensor 11-1, the light source is illustrated as a light source 52-1. Similarly, a light source 52-2 in the depth sensor 11-2 is illustrated. Note that, in FIG. 11, sites corresponding to those in FIG. 1 are denoted by the same reference signs, and the description thereof is omitted.

The timing control unit 51 generates a control signal and supplies the control signal to each of the depth sensor 11-1 and the depth sensor 11-2. In the depth sensor 11-1, the light source 52-1 that irradiates the subject S with light and the light receiving element that receives light reflected from the subject S operate in synchronization with each other according to the control signal from the timing control unit 51. In the depth sensor 11-2, the light source 52-2 that irradiates the subject S with light and a light receiving element that receives light reflected from the subject S operate in synchronization with each other according to the control signal from the timing control unit 51.

(Technique for Suppressing Degradation Caused by Overlap Between Fields of View)

Although a defect of an image caused by an overlap between fields of view of depth sensors is corrected using a trained model (learning model) trained by machine learning in the above description, for example, an image having fewer defects can be generated by using the following technique for suppressing image degradation caused by an overlap between fields of view in combination.

That is, as the technique for suppressing image degradation caused by an overlap between fields of view, there is a technique in which wavelengths of a light source and a band-pass filter are made different between in the depth sensor 11-1 and the depth sensor 11-2. Furthermore, the probability of overlapping between fields of view can be reduced by using a technique in which light sources in the depth sensor 11-1 and the depth sensor 11-2 have dot patterns. Moreover, there is a technique in which measurement (image capturing) in which the depth sensor 11-1 and the depth sensor 11-2 are alternately synchronized using a dead time of a RAW frame image capturing level. When the alternately synchronized measurement is performed in this manner, it is possible to prevent fields of view from overlapping each other temporally.

Furthermore, there is a technique in which measurement (image capturing) is performed by varying a modulation pattern, a modulation frequency, or the like between a light source of the depth sensor 11-1 and a light source of the depth sensor 11-2. In a case where the measurement is performed by varying the modulation pattern between the light sources, the modulation patterns of the light sources are controlled so as not to overlap each other in synchronization in order to avoid interference. In a case that the measurement is performed by varying the modulation frequency between the light sources, control is performed such that measurement (image capturing) patterns such as dual frequencies do not overlap each other temporally. Moreover, there is a technique in which measurement (image capturing) is performed by shifting an exposure timing between a light source and a light receiving element in the depth sensor 11-1 and the depth sensor 11-2. When the measurement is performed by shifting the exposure timing in this manner, it is possible to prevent fields of view from overlapping each other temporally.

Note that the technique for suppressing image degradation caused by an overlap between fields of view described here may be used alone as well as combined with correction using a learning model at the time of inference. Even in a case where the technique for suppressing image degradation caused by an overlap between fields of view is used alone, image degradation caused by an overlap between fields of view can be suppressed, and an image having fewer defects can be generated.

As described above, in the technology according to the present disclosure, a correction target pixel (for example, a defective pixel having a defect in a depth value) included in any image can be corrected by performing processing using a trained model trained by machine learning on at least a part of a depth image acquired by the depth sensor 11-1, a depth image acquired by the depth sensor 11-2, and an image obtained from these depth images (for example, a wide-angle depth image obtained by connecting the two depth images). Therefore, even in a case where the depth sensor 11-1 and the depth sensor 11-2 are arranged to have a predetermined relationship such as a case of being arranged such that fields of view overlap each other or a case of being arranged such that fields of view do not overlap each other, it is possible to correct the correction target pixel caused by these fields of view.

Therefore, a wide-angle depth image in which a defect has been corrected is obtained, and thus, for example, the wide-angle depth image can be used in the next use case. That is, the corrected wide-angle depth image can be used for progress management by building measurement or topography measurement at a building construction site or a construction site. Alternatively, the corrected wide-angle depth image can be used as a preliminary drawing of a computer graphics (CG) modeling environment in a game, a movie, or the like. Moreover, for a moving body such as an automobile or a construction machine, the corrected wide-angle depth image can be used to implement a surrounding safety sensing function and a self-localization function for automated driving.

Note that the distance measuring device 10 described above can be regarded as an information processing device including a processing unit (the stitching processing unit 13, the distance correction unit 14, and the like) that processes depth images acquired by a plurality of sensors (the depth sensor 11-1, the depth sensor 11-2, and the like). The distance measuring devices 20 to 50 can be similarly regarded as information processing devices. Furthermore, the case where the distance measuring device 10 includes two depth sensors of the depth sensor 11-1 and the depth sensor 11-2 has been described, but the technology according to the present disclosure can be similarly applied to a case where three or more depth sensors are provided. Furthermore, FIG. 7 illustrates the case where two light sources of the light source LS1 and the light source LS2 are provided for one depth sensor 11, but the technology according to the present disclosure can be similarly applied to a case where three or more light sources are provided.

(Extension Example)

Figure 12:
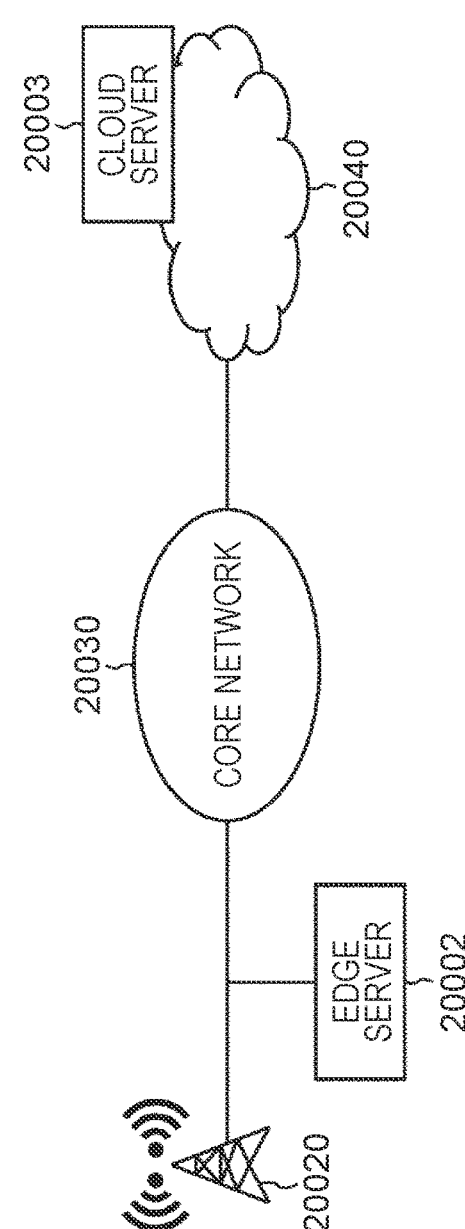
FIG. 12 is a diagram illustrating a configuration example of a system including a device that performs AI processing.
Figure 12:
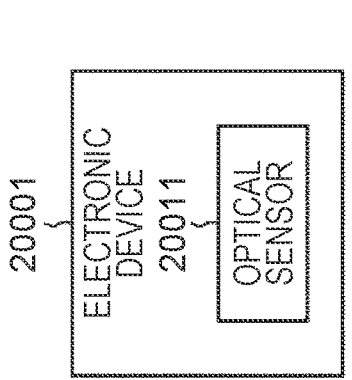

FIG. 12 illustrates a configuration example of a system including a device that performs AI processing.

An electronic device 20001 is a mobile terminal such as a smartphone, a tablet terminal, or a mobile phone. The electronic device 20001 corresponds to, for example, the distance measuring device 10 (information processing device) in FIG. 1, and includes an optical sensor 20011 corresponding to the depth sensors 11-1 and 11-2 (FIG. 1). The optical sensor is a sensor (image sensor) that converts light into an electric signal. The electronic device 20001 can be connected to a network 20040 such as the Internet via a core network 20030 by being connected to a base station 20020 installed at a predetermined place by wireless communication corresponding to a predetermined communication method.

At a location closer to the mobile terminal, such as between the base station 20020 and the core network 20030, an edge server 20002 is provided to implement mobile edge computing (MEC). A cloud server 20003 is connected to the network 20040. The edge server 20002 and the cloud server 20003 can perform various types of processing according to the purpose. Note that the edge server 20002 may be provided in the core network 20030.

AI processing is performed by the electronic device 20001, the edge server 20002, the cloud server 20003, or the optical sensor 20011. The AI processing is processing the technology according to the present disclosure using AI such as machine learning. The AI processing includes learning processing and inference processing. The learning processing is processing of generating a learning model. Furthermore, the learning processing also includes relearning processing as described later. The inference processing is processing of performing inference using a learning model.

In the electronic device 20001, the edge server 20002, the cloud server 20003, or the optical sensor 20011, a processor such as a central processing unit (CPU) executes a program or dedicated hardware such as a processor specialized for a specific purpose is used to implement AI processing. For example, a graphics processing unit (GPU) can be used as a processor specialized for a specific purpose.

Figure 13:
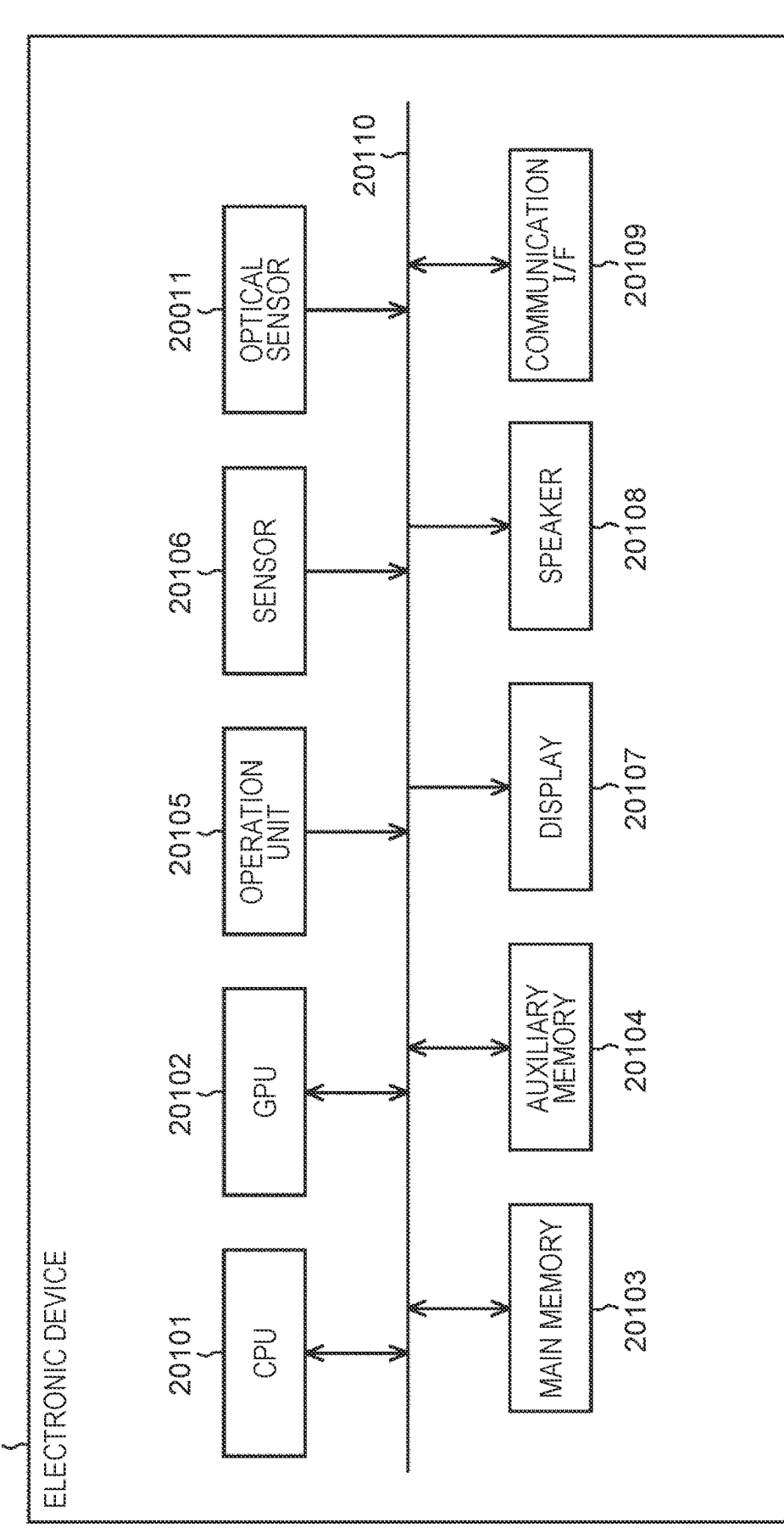
FIG. 13 is a block diagram illustrating a configuration example of an electronic device.

FIG. 13 illustrates a configuration example of the electronic device 20001. The electronic device 20001 includes a CPU 20101 that controls operation of each unit and performs various types of processing, a GPU 20102 specialized for image processing and parallel processing, a main memory 20103 such as a dynamic random access memory (DRAM), and an auxiliary memory 20104 such as a flash memory.

The auxiliary memory 20104 records programs for AI processing and data such as various parameters. The CPU 20101 loads the programs and parameters recorded in the auxiliary memory 20104 into the main memory 20103 and executes the programs. Alternatively, the CPU 20101 and the GPU 20102 develop programs and parameters recorded in the auxiliary memory 20104 in the main memory 20103 and execute the programs. Therefore, the GPU 20102 can be used as a general-purpose computing on graphics processing units (GPGPU).

Note that the CPU 20101 and the GPU 20102 may be configured as a system on a chip (SoC). In a case where the CPU 20101 executes programs for AI processing, the GPU 20102 may not be provided.

The electronic device 20001 also includes the optical sensor 20011 to which the technology according to the present disclosure is applied, an operation unit 20105 such as a physical button or a touch panel, a sensor 20106 including at least one or more sensors, a display 20107 that displays information such as an image or text, a speaker 20108 that outputs sound, a communication I/F 20109 such as a communication module compatible with a predetermined communication method, and a bus 20110 that connects them.

The sensor 20106 includes at least one of various sensors such as an optical sensor (image sensor), a sound sensor (microphone), a vibration sensor, an acceleration sensor, an angular velocity sensor, a pressure sensor, an odor sensor, or a biometric sensor. In the AI processing, data acquired from at least one or more sensors of the sensor 20106 can be used together with data (image data) acquired from the optical sensor 20011. Note that the optical sensor 20011 may correspond to the depth sensor 11-1 (FIG. 1), and the sensor 20106 may correspond to the depth sensor 11-2 (FIG. 1).

Note that data acquired from two or more optical sensors by the sensor fusion technology and data obtained by integrally processing the data may be used in the AI processing. As the two or more optical sensors, a combination of the optical sensor 20011 and the optical sensor in the sensor 20106 may be used, or a plurality of optical sensors may be included in the optical sensor 20011. For example, the optical sensor includes an RGB visible light sensor, a distance measuring sensor such as time of flight (ToF), a polarization sensor, an event-based sensor, a sensor that acquires an IR image, a sensor capable of acquiring multiple wavelengths, and the like.

In the electronic device 20001, AI processing can be performed by a processor such as the CPU 20101 or the GPU 20102. In a case where the processor of the electronic device 20001 performs the inference processing, since the processing can be started without requiring time after the image data is acquired by the optical sensor 20011, the processing can be performed at high speed. Therefore, in the electronic device 20001, when the inference processing is used for a purpose such as an application required to transmit information with a short delay time, the user can perform an operation without feeling uncomfortable due to the delay. Furthermore, in a case where the processor of the electronic device 20001 performs AI processing, it is not necessary to use a communication line, a computer device for a server, or the like, and the processing can be implemented at low cost, as compared with a case where a server such as the cloud server 20003 is used.

Figure 14:
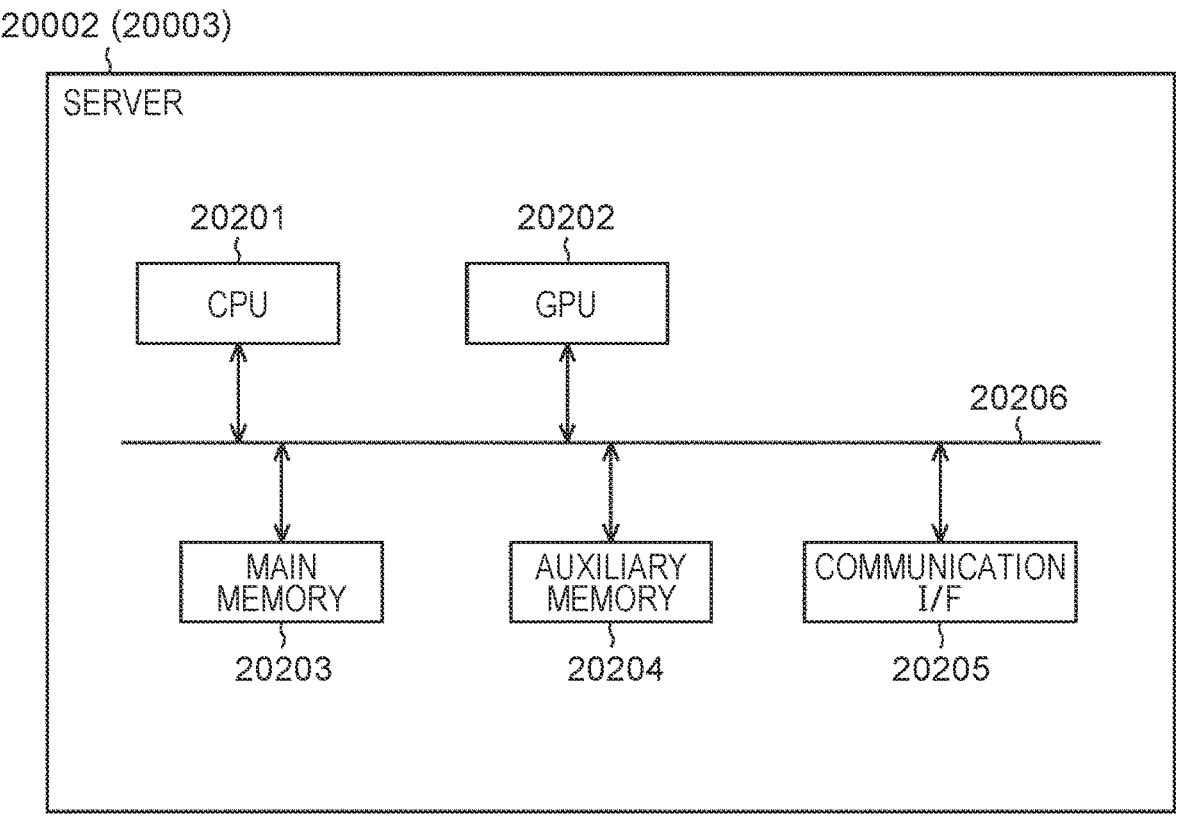
FIG. 14 is a block diagram illustrating a configuration example of an edge server or a cloud server.

FIG. 14 illustrates a configuration example of the edge server 20002. The edge server 20002 includes a CPU 20201 that controls operation of each unit and performs various types of processing, and a GPU 20202 specialized for image processing and parallel processing. The edge server 20002 further includes a main memory 20203 such as a DRAM, an auxiliary memory 20204 such as a hard disk drive (HDD) or a solid state drive (SSD), and a communication I/F 20205 such as a network interface card (NIC), which are connected to the bus 20206.

The auxiliary memory 20204 records programs for AI processing and data such as various parameters. The CPU 20201 loads the programs and parameters recorded in the auxiliary memory 20204 into the main memory 20203 and executes the programs. Alternatively, the CPU 20201 and the GPU 20202 can develop programs or parameters recorded in the auxiliary memory 20204 in the main memory 20203 and execute the programs, whereby the GPU 20202 is used as a GPGPU. Note that, in a case where the CPU 20201 executes programs for AI processing, the GPU 20202 may not be provided.

In the edge server 20002, AI processing can be performed by a processor such as the CPU 20201 or the GPU 20202. In a case where the processor of the edge server 20002 performs the AI processing, since the edge server 20002 is provided at a position closer to the electronic device 20001 than the cloud server 20003, it is possible to realize low processing delay. Furthermore, the edge server 20002 has higher processing capability, such as a calculation speed, than the electronic device 20001 and the optical sensor 20011, and thus can be configured in a general-purpose manner. Therefore, in a case where the processor of the edge server 20002 performs the AI processing, the AI processing can be performed as long as data can be received regardless of a difference in specification or performance of the electronic device 20001 or the optical sensor 20011. In a case where the AI processing is performed by the edge server 20002, a processing load in the electronic device 20001 and the optical sensor 20011 can be reduced.

Since the configuration of the cloud server 20003 is similar to the configuration of the edge server 20002, the description thereof will be omitted.

In the cloud server 20003, AI processing can be performed by a processor such as the CPU 20201 or the GPU 20202. The cloud server 20003 has higher processing capability, such as calculation speed, than the electronic device 20001 and the optical sensor 20011, and thus can be configured in a general-purpose manner. Therefore, in a case where the processor of the cloud server 20003 performs the AI processing, the AI processing can be performed regardless of a difference in specifications and performance of the electronic device 20001 and the optical sensor 20011. Furthermore, in a case where it is difficult for the processor of the electronic device 20001 or the optical sensor 20011 to perform high-load AI processing, the processor of the cloud server 20003 can perform the high-load AI processing, and the processing result can be fed back to the processor of the electronic device 20001 or the optical sensor 20011.

Figure 15:
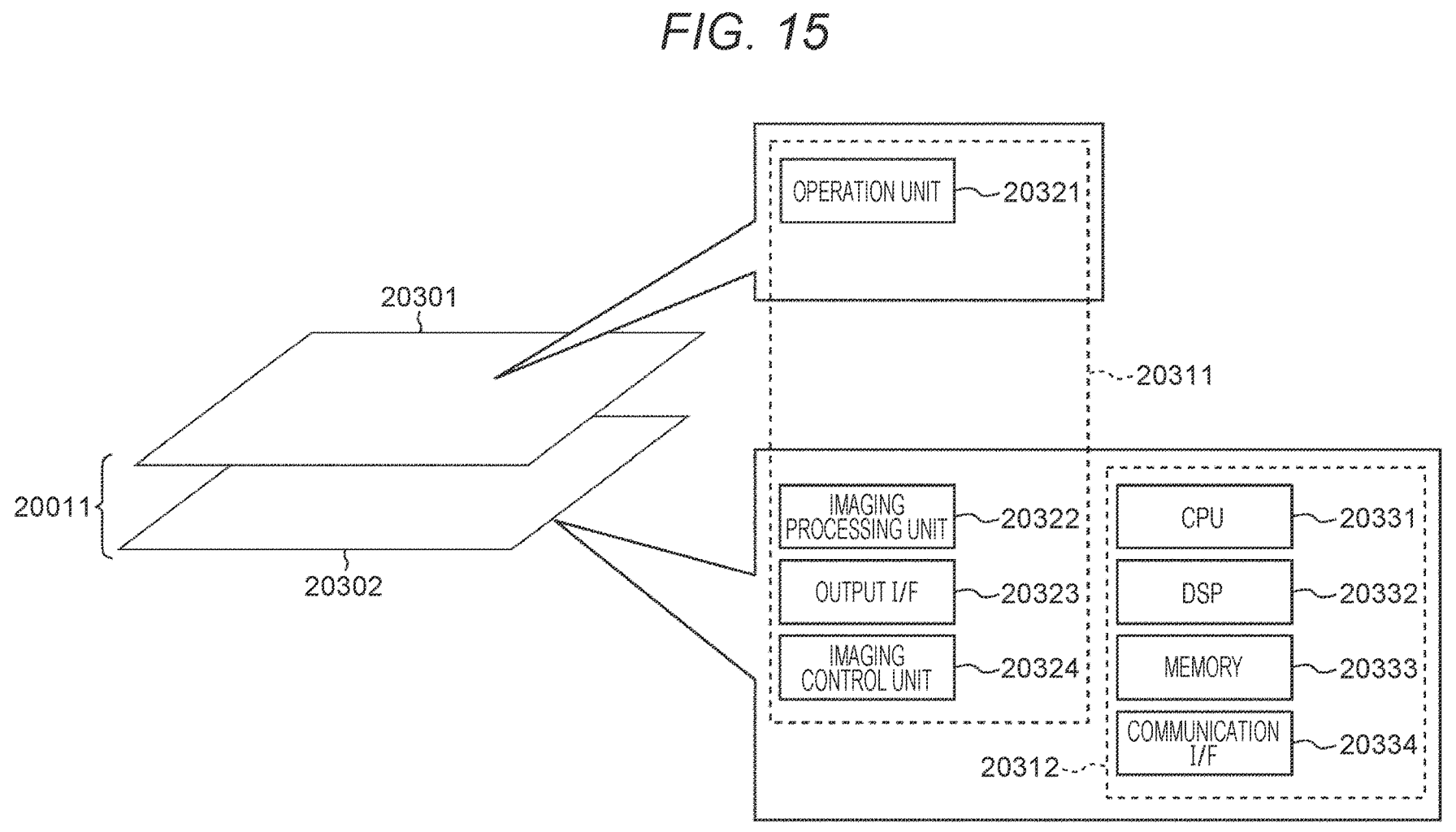

FIG. 15 illustrates a configuration example of the optical sensor 20011. The optical sensor 20011 can be configured as, for example, a one-chip semiconductor device having a stacked structure in which a plurality of substrates is stacked. The optical sensor 20011 is configured by stacking two substrates of a substrate 20301 and a substrate 20302. Note that the configuration of the optical sensor 20011 is not limited to the stacked structure, and for example, a substrate including an imaging unit may include a processor that performs AI processing such as a CPU or a digital signal processor (DSP).

An imaging unit 20321 including a plurality of pixels two-dimensionally arranged is mounted on the upper substrate 20301. An imaging processing unit 20322 that performs processing related to imaging of an image by the imaging unit 20321, an output I/F 20323 that outputs a captured image and a signal processing result to the outside, and an imaging control unit 20324 that controls imaging of an image by the imaging unit 20321 are mounted on the lower substrate 20302. The imaging unit 20321, the imaging processing unit 20322, the output I/F 20323, and the imaging control unit 20324 constitute an imaging block 20311.

A CPU 20331 that performs control of each unit and various types of processing, a DSP 20332 that performs signal processing using a captured image, information from the outside, and the like, a memory 20333 such as a static random access memory (SRAM) or a dynamic random access memory (DRAM), and a communication I/F 20334 that exchanges necessary information with the outside are mounted on the lower substrate 20302. The CPU 20331, the DSP 20332, the memory 20333, and the communication I/F 20334 constitute a signal processing block 20312. AI processing can be performed by at least one processor of the CPU 20331 or the DSP 20332.

As described above, the signal processing block 20312 for AI processing can be mounted on the lower substrate 20302 in the stacked structure in which the plurality of substrates is stacked. Therefore, the image data acquired by the imaging block 20311 for imaging mounted on the upper substrate 20301 is processed by the signal processing block 20312 for AI processing mounted on the lower substrate 20302, so that a series of processing can be performed in the one-chip semiconductor device.

In the optical sensor 20011, AI processing can be performed by a processor such as the CPU 20331. In a case where the processor of the optical sensor 20011 performs AI processing such as inference processing, since a series of processing is performed in a one-chip semiconductor device, information does not leak to the outside of the sensor, and thus, it is possible to enhance confidentiality of the information. Furthermore, since it is not necessary to transmit data such as image data to another device, the processor of the optical sensor 20011 can perform AI processing such as inference processing using the image data at high speed. For example, when inference processing is used for a purpose such as an application requiring a real-time property, it is possible to sufficiently secure the real-time property. Here, securing the real-time property means that information can be transmitted with a short delay time. Moreover, when the processor of the optical sensor 20011 performs the AI processing, various kinds of metadata are passed by the processor of the electronic device 20001, so that the processing can be reduced and the power consumption can be reduced.

Figure 16:
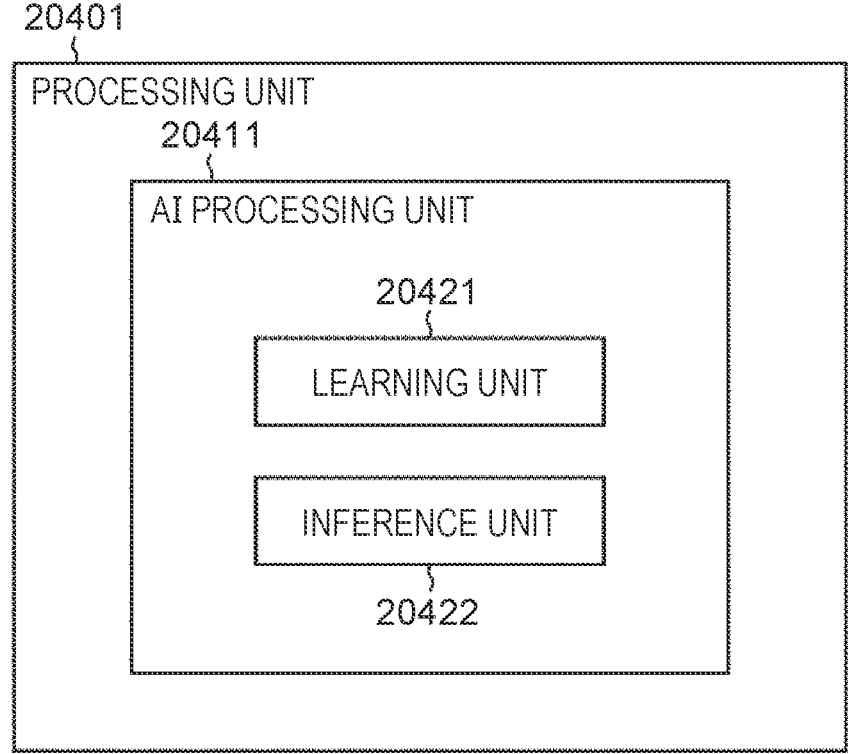
FIG. 16 is a block diagram illustrating a configuration example of a processing unit.

FIG. 16 illustrates a configuration example of a processing unit 20401. A processor of the electronic device 20001, the edge server 20002, the cloud server 20003, or the optical sensor 20011 executes various types of processing according to a program, thereby functioning as the processing unit 20401. Note that a plurality of processors included in the same or different devices may function as the processing unit 20401.

The processing unit 20401 includes an AI processing unit 20411. The AI processing unit 20411 performs AI processing. The AI processing unit 20411 includes a learning unit 20421 and an inference unit 20422.

The learning unit 20421 performs learning processing of generating a learning model. In the learning processing, a machine-learned learning model that has been subjected to machine learning for correcting a correction target pixel included in image data is generated. Furthermore, the learning unit 20421 may perform relearning processing of updating the generated learning model. In the following description, generation and update of the learning model will be described separately, but since it can be said that the learning model is generated by updating the learning model, the generation of the learning model includes the meaning of the update of the learning model.

Furthermore, the generated learning model is recorded in a storage medium such as a main memory or an auxiliary memory included in the electronic device 20001, the edge server 20002, the cloud server 20003, the optical sensor 20011, or the like, and thus, can be newly used in the inference processing performed by the inference unit 20422. Therefore, the electronic device 20001, the edge server 20002, the cloud server 20003, the optical sensor 20011, or the like that performs inference processing based on the learning model can be generated. Moreover, the generated learning model may be recorded in a storage medium or electronic device independent of the electronic device 20001, the edge server 20002, the cloud server 20003, the optical sensor 20011, or the like, and provided for use in other devices. Note that the generation of the electronic device 20001, the edge server 20002, the cloud server 20003, the optical sensor 20011, or the like includes not only newly recording the learning model in the storage medium at the time of manufacturing but also updating the already recorded generated learning model.

The inference unit 20422 performs inference processing using the learning model. In the inference processing, processing of identifying a correction target pixel included in image data or correcting the identified correction target pixel is performed using the learning model. The correction target pixel is a pixel to be corrected that satisfies a predetermined condition among a plurality of pixels in an image according to the image data.

As a technique of machine learning, a neural network, deep learning, or the like can be used. The neural network is a model imitating a human cranial nerve circuit, and includes three types of layers of an input layer, an intermediate layer (hidden layer), and an output layer. Deep learning is a model using a neural network having a multilayer structure, and can learn a complex pattern hidden in a large amount of data by repeating characteristic learning in each layer.

Supervised learning can be used as the problem setting of the machine learning. For example, in the supervised learning, a feature amount is learned on the basis of given labeled supervised data. Therefore, it is possible to derive a label of unknown data. As the learning data, image data actually acquired by the optical sensor, acquired image data aggregated and managed, a data set generated by the simulator, and the like can be used.

Note that not only supervised learning but also unsupervised learning, semi-supervised learning, reinforcement learning, and the like may be used. In the unsupervised learning, a large amount of unlabeled learning data is analyzed to extract a feature amount, and clustering or the like is performed on the basis of the extracted feature amount. Therefore, it is possible to analyze and predict the tendency on the basis of a huge amount of unknown data. The semi-supervised learning is a method in which supervised learning and unsupervised learning are mixed, and is a method in which a feature amount is trained by the supervised learning, then a huge amount of learning data is given by the unsupervised learning, and repetitive learning is performed while the feature amount is automatically calculated. The reinforcement learning deals with a problem of determining an action that an agent in a certain environment should take by observing a current state.

As described above, the processor of the electronic device 20001, the edge server 20002, the cloud server 20003, or the optical sensor 20011 functions as the AI processing unit 20411, so that the AI processing is performed by any one or a plurality of devices.

The AI processing unit 20411 only needs to include at least one of the learning unit 20421 or the inference unit 20422. That is, the processor of each device may execute one of the learning processing or the inference processing as well as execute both the learning processing and the inference processing. For example, in a case where the processor of the electronic device 20001 performs both the inference processing and the learning processing, the learning unit 20421 and the inference unit 20422 are included, but in a case where only the inference processing is performed, only the inference unit 20422 may be included.

The processor of each device may execute all processes related to the learning processing or the inference processing, or may execute some processes by the processor of each device and then execute the remaining processes by the processor of another device. Furthermore, each device may have a common processor for executing each function of AI processing such as learning processing or inference processing, or may have a processor individually for each function.

Note that the AI processing may be performed by a device other than the above-described devices. For example, AI processing can be performed by another electronic device to which the electronic device 20001 can be connected by wireless communication or the like. Specifically, in a case where the electronic device 20001 is a smartphone, the other electronic device that performs the AI processing can be a device such as another smartphone, a tablet terminal, a mobile phone, a personal computer (PC), a game machine, a television receiver, a wearable terminal, a digital still camera, or a digital video camera.

Furthermore, even in a configuration using a sensor mounted on a moving body such as an automobile, a sensor used in a remote medical device, or the like, AI processing such as inference processing can be applied, but a delay time is required to be short in these environments. In such an environment, the delay time can be shortened by not performing the AI processing by the processor of the cloud server 20003 via the network 20040 but performing the AI processing by the processor of the local-side device (for example, the electronic device 20001 as the in-vehicle device or the medical device). Moreover, even in a case where there is no environment to connect to the network 20040 such as the Internet or in a case of a device used in an environment in which high-speed connection cannot be performed, AI processing can be performed in a more appropriate environment by performing AI processing by the processor of the local-side device such as the electronic device 20001 or the optical sensor 20011, for example.

Note that the above-described configuration is an example, and other configurations may be adopted. For example, the electronic device 20001 is not limited to a mobile terminal such as a smartphone, and may be an electronic device such as a PC, a game machine, a television receiver, a wearable terminal, a digital still camera, or a digital video camera, an in-vehicle device, or a medical device. Furthermore, the electronic device 20001 may be connected to the network 20040 by wireless communication or wired communication corresponding to a predetermined communication method such as a wireless local area network (LAN) or a wired LAN. The AI processing is not limited to a processor such as a CPU or a GPU of each device, and a quantum computer, a neuromorphic computer, or the like may be used.

Figure 17:
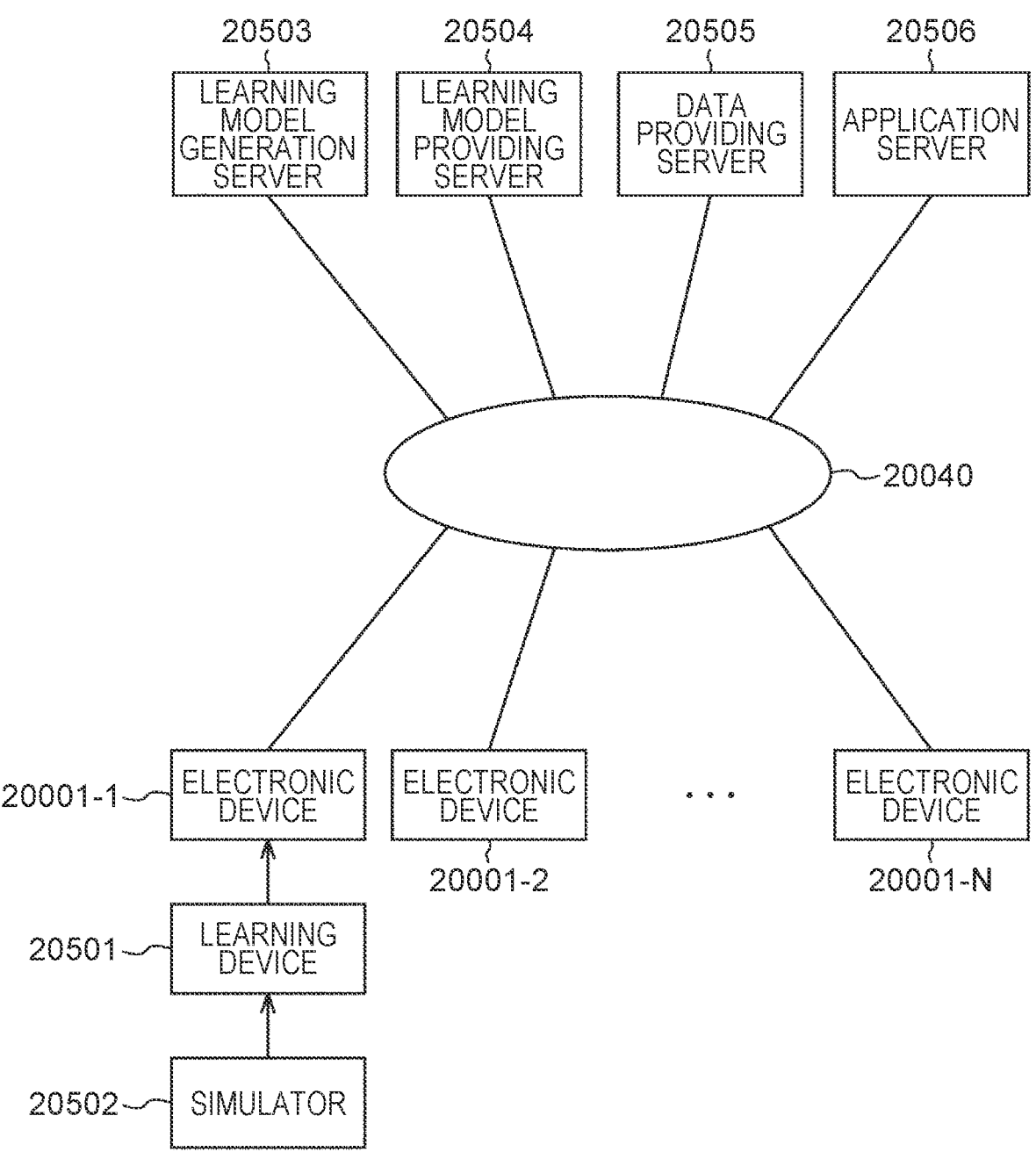
FIG. 17 is a diagram illustrating a flow of data between a plurality of devices.

Incidentally, the data such as the learning model, the image data, and the corrected data may be used in a single device or may be exchanged between a plurality of devices and used in those devices. FIG. 17 illustrates a flow of data between a plurality of devices.

Electronic devices 20001-1 to 20001-N (N is an integer of 1 or more) are possessed by each user, for example, and can be connected to the network 20040 such as the Internet via a base station (not illustrated) or the like. At the time of manufacturing, a learning device 20501 is connected to the electronic device 20001-1, and the learning model provided by the learning device 20501 can be recorded in the auxiliary memory 20104. The learning device 20501 generates a learning model by using a data set generated by a simulator 20502 as learning data and provides the learning model to the electronic device 20001-1. Note that the learning data is not limited to the data set provided from the simulator 20502, and image data actually acquired by the optical sensor, acquired image data aggregated and managed, or the like may be used.

Although not illustrated, the learning model can be recorded in the electronic devices 20001-2 to 20001-N at the stage of manufacturing, similarly to the electronic device 20001-1. Hereinafter, the electronic devices 20001-1 to 20001-N will be referred to as electronic devices 20001 in a case where it is not necessary to distinguish the electronic devices from each other.

In addition to the electronic device 20001, a learning model generation server 20503, a learning model providing server 20504, a data providing server 20505, and an application server 20506 are connected to the network 20040, and can exchange data with each other. Each server can be provided as a cloud server.

The learning model generation server 20503 has a configuration similar to that of the cloud server 20003, and can perform learning processing by a processor such as a CPU. The learning model generation server 20503 generates a learning model using the learning data. In the illustrated configuration, the case where the electronic device 20001 records the learning model at the time of manufacturing is exemplified, but the learning model may be provided from the learning model generation server 20503. The learning model generation server 20503 transmits the generated learning model to the electronic device 20001 via the network 20040. The electronic device 20001 receives the learning model transmitted from the learning model generation server 20503 and records the learning model in the auxiliary memory 20104. Therefore, the electronic device 20001 including the learning model is generated.

That is, in the electronic device 20001, in a case where the learning model is not recorded at the stage of manufacturing, the electronic device 20001 recording the new learning model is generated by newly recording the learning model from the learning model generation server 20503. Furthermore, in the electronic device 20001, in a case where the learning model has already been recorded at the stage of manufacturing, the electronic device 20001 recording the updated learning model is generated by updating the recorded learning model to the learning model from the learning model generation server 20503. The electronic device 20001 can perform inference processing using a learning model that is appropriately updated.

The learning model is not limited to being directly provided from the learning model generation server 20503 to the electronic device 20001, and may be provided by the learning model providing server 20504 that aggregates and manages various learning models via the network 20040. The learning model providing server 20504 may generate another device including a learning model by providing the learning model to the other device, not limited to the electronic device 20001. Furthermore, the learning model may be provided by being recorded in a detachable memory card such as a flash memory. The electronic device 20001 can read and record the learning model from the memory card attached to the slot. Therefore, the electronic device 20001 can acquire the learning model even in a case where the electronic device is used in a severe environment, in a case where the electronic device does not have a communication function, in a case where the electronic device has a communication function but the amount of information that can be transmitted is small, or the like.

The electronic device 20001 can provide data such as image data, corrected data, and metadata to other devices via the network 20040. For example, the electronic device 20001 transmits data such as image data and corrected data to the learning model generation server 20503 via the network 20040. Therefore, the learning model generation server 20503 can generate a learning model using data such as image data or corrected data collected from one or a plurality of electronic devices 20001 as learning data. By using more learning data, the accuracy of the learning processing can be improved.

The data such as the image data and the corrected data is not limited to be directly provided from the electronic device 20001 to the learning model generation server 20503, and may be provided by the data providing server 20505 that aggregates and manages various data. The data providing server 20505 may collect data from not only the electronic device 20001 but also another device, or may provide data to not only the learning model generation server 20503 but also another device.

The learning model generation server 20503 may perform relearning processing of adding data such as image data and corrected data provided from the electronic device 20001 or the data providing server 20505 to the learning data on the already-generated learning model to update the learning model. The updated learning model can be provided to the electronic device 20001. In a case where learning processing or relearning processing is performed in the learning model generation server 20503, processing can be performed regardless of a difference in specification or performance of the electronic device 20001.

Furthermore, in the electronic device 20001, in a case where the user performs a correction operation on the corrected data or the metadata (for example, in a case where the user inputs correct information), the feedback data regarding the correction processing may be used for the relearning processing. For example, by transmitting the feedback data from the electronic device 20001 to the learning model generation server 20503, the learning model generation server 20503 can perform relearning processing using the feedback data from the electronic device 20001 and update the learning model. Note that, in the electronic device 20001, an application provided by the application server 20506 may be used when the user performs a correction operation.

The relearning processing may be performed by the electronic device 20001. In a case where the electronic device 20001 updates the learning model by performing the relearning processing using the image data or the feedback data, the learning model can be improved in the device. Therefore, the electronic device 20001 including the updated learning model is generated. Furthermore, the electronic device 20001 may transmit the learning model after update obtained by the relearning processing to the learning model providing server 20504 so as to be provided to another electronic device 20001. Therefore, the learning model after the update can be shared among the plurality of electronic devices 20001.

Alternatively, the electronic device 20001 may transmit difference information of the relearning learning model (difference information regarding the learning model before update and the learning model after update) to the learning model generation server 20503 as update information. The learning model generation server 20503 can generate an improved learning model on the basis of the update information from the electronic device 20001 and provide the improved learning model to another electronic device 20001. By exchanging such difference information, privacy can be protected and communication cost can be reduced as compared with a case where all information is exchanged. Note that, similarly to the electronic device 20001, the optical sensor 20011 mounted on the electronic device 20001 may perform the relearning processing.

The application server 20506 is a server capable of providing various applications via the network 20040. An application provides a predetermined function using data such as a learning model, corrected data, or metadata. The electronic device 20001 can implement a predetermined function by executing an application downloaded from the application server 20506 via the network 20040. Alternatively, the application server 20506 can also implement a predetermined function by acquiring data from the electronic device 20001 via, for example, an application programming interface (API) or the like and executing an application on the application server 20506.

As described above, in a system including a device to which the present technology is applied, data such as a learning model, image data, and corrected data is exchanged and distributed among the devices, and various services using the data can be provided. For example, it is possible to provide a service for providing a learning model via the learning model providing server 20504 and a service for providing data such as image data and corrected data via the data providing server 20505. Furthermore, it is possible to provide a service for providing an application via the application server 20506.

Alternatively, the image data acquired from the optical sensor 20011 of the electronic device 20001 may be input to the learning model provided by the learning model providing server 20504, and corrected data obtained as an output thereof may be provided. Furthermore, a device such as an electronic device on which the learning model provided by the learning model providing server 20504 is equipped may be generated and provided. Moreover, by recording data such as the learning model, the corrected data, and the metadata in a readable storage medium, a device such as a storage medium in which the data is recorded or an electronic device on which the storage medium is mounted may be generated and provided. The storage medium may be a nonvolatile memory such as a magnetic disk, an optical disk, a magneto-optical disk, or a semiconductor memory, or may be a volatile memory such as an SRAM or a DRAM.

Note that embodiments of the present disclosure are not limited to the above-described embodiments, and various modifications are possible without departing from the scope of the present disclosure. Furthermore, the advantageous effects described in this specification are merely examples, and the advantageous effects of the technology are not limited to them and may include other effects.

Furthermore, the present disclosure can have the following configurations.

(1)

An information processing device including a processing unit that performs processing using a trained model trained by machine learning on at least a part of a first image in which a subject acquired by a first sensor is indicated by depth information, a second image in which the subject acquired by a second sensor is indicated by depth information, and a third image obtained from the first image and the second image to correct a correction target pixel included in any of the images.

(2)

The information processing device according to (1), in which the first sensor and the second sensor are disposed to have fields of view overlapping each other, and the processing unit identifies a position corresponding to an overlapping portion between the fields of view in the third image as a pixel correction position when the third image is generated by connecting the first image and the second image, and corrects depth information of the pixel correction position using the trained model.

(3)

The information processing device according to (2), in which the trained model is a model configured to output the third image in which a defect of depth information caused by the overlapping portion between the fields of view has been corrected by learning using the third image having the defect and the pixel correction position as inputs, and the processing unit performs inference using the trained model with the third image having a defect in depth information caused by the overlapping portion between the fields of view and the pixel correction position as inputs to generate the third image in which the defect has been corrected.

(4)

The information processing device according to (1), in which the first sensor and the second sensor are disposed to have fields of view overlapping each other, and the processing unit identifies a position corresponding to an overlapping portion between the fields of view in the first image and the second image as a pixel correction position when the third image is generated by connecting the first image and the second image, and corrects depth information of the pixel correction position using the trained model.

(5)

The information processing device according to (4), in which the trained model is a model configured to output the first image or the second image in which a defect of depth information caused by the overlapping portion between the fields of view has been corrected by learning using the first image or the second image having the defect and the pixel correction position as inputs, and the processing unit performs inference using the trained model with the first image or the second image having a defect in depth information caused by the overlapping portion between the fields of view and the pixel correction position as inputs to generate the first image or the second image in which the defect has been corrected, and connects the first image and the second image to generate the third image.

(6)

The information processing device according to (1), in which the first sensor and the second sensor are disposed to have fields of view not overlapping each other, and the processing unit identifies a position corresponding to a gap portion between the fields of view in the third image as a pixel correction position when the third image is generated by connecting the first image and the second image, and corrects depth information of the pixel correction position using the trained model.

(7)

The information processing device according to (6), in which the trained model is a model configured to output the third image in which a defect of depth information caused by the gap portion between the fields of view has been corrected by learning using the third image having the defect and the pixel correction position as inputs, and the processing unit performs inference using the trained model with the third image having a defect in depth information caused by the gap portion between the fields of view and the pixel correction position as inputs to generate the third image in which the defect has been corrected.

(8)

The information processing device according to (1), in which the first sensor and the second sensor are sensors having different fields of view, and are arranged to have the fields of view overlapping each other, and the processing unit identifies a position corresponding to an overlapping portion between the fields of view in the third image as a pixel correction position when the third image is generated by connecting the first image and the second image, and corrects depth information of the pixel correction position using the trained model.

(9)

The information processing device according to (8), in which the trained model is a model configured to output the third image in which a defect of depth information caused by the overlapping portion between the fields of view has been corrected by learning using the third image having the defect and the pixel correction position as inputs, and the processing unit performs inference using the trained model with the third image having a defect in depth information caused by the overlapping portion between the fields of view and the pixel correction position as inputs to generate the third image in which the defect has been corrected.

(10)

The information processing device according to (8) or (9), in which the first sensor has the field of view corresponding to a wide angle, and the second sensor has the field of view corresponding to a telephoto.

(11)

An information processing method including performing, by an information processing device, processing using a trained model trained by machine learning on at least a part of a first image in which a subject acquired by a first sensor is indicated by depth information, a second image in which the subject acquired by a second sensor is indicated by depth information, and a third image obtained from the first image and the second image to correct a correction target pixel included in any of the images.

(12)

A program for causing a computer to function as an information processing device including a processing unit, the processing unit performing processing using a trained model trained by machine learning on at least a part of a first image in which a subject acquired by a first sensor is indicated by depth information, a second image in which the subject acquired by a second sensor is indicated by depth information, and a third image obtained from the first image and the second image to correct a correction target pixel included in any of the images.

(13)

An information processing device including a processing unit that performs processing using a trained model trained by machine learning on at least a part of an image indicating a subject, acquired by a sensor including a first light source and a second light source, by depth information, in which the first light source and the second light source are arranged to have irradiation regions of light overlapping each other, and the processing unit identifies a position corresponding to an overlapping portion between the irradiation regions in the image as a pixel correction position, and corrects depth information of the pixel correction position using the trained model.

(14)

The information processing device according to (13), in which the trained model is a model configured to output the image in which a defect of depth information caused by the overlapping portion between the irradiation regions has been corrected by learning using the image having the defect and the pixel correction position as inputs, and the processing unit performs inference using the trained model with the image having a defect in depth information caused by the overlapping portion between the irradiation regions and the pixel correction position as inputs to generate the image in which the defect has been corrected.

(15)

An information processing method including:

performing, by an information processing device, processing using a trained model trained by machine learning on at least a part of an image indicating a subject, acquired by a sensor including a first light source and a second light source arranged to have irradiation regions of light overlapping each other, by depth information;

identifying, by the information processing device, a position corresponding to an overlapping portion between the irradiation regions in the image as a pixel correction position; and correcting, by the information processing device, depth information of the pixel correction position using the trained model.

(16)

A program for causing a computer to function as an information processing device, the information processing device including a processing unit that performs processing using a trained model trained by machine learning on at least a part of an image indicating a subject, acquired by a sensor including a first light source and a second light source arranged to have irradiation regions of light overlapping each other, by depth information, the processing unit identifying a position corresponding to an overlapping portion between the irradiation regions in the image as a pixel correction position, and correcting depth information of the pixel correction position using the trained model.

REFERENCE SIGNS LIST

10, 20, 30, 40, 50 Distance measuring device
11, 11-1, 11-2 Depth sensor
12-1, 12-2 Distance measurement calculation unit
13 Stitching processing unit
14 Distance correction unit
20 Learning device
21-1, 21-2 Distance correction unit
22 Stitching processing unit
31 Distance correction/stitching processing unit
41 Distance measurement calculation/distance correction/ stitching processing unit
51 Timing control unit
52-1, 52-2 Light source
111 Inference unit
121 Learning model
200 Learning device
221 Learning model

The invention claimed is:

1. An information processing device comprising:

a processor that performs processing using a trained model trained by machine learning on at least a part of a first image in which a subject acquired by a first sensor is indicated by depth information, a second image in which the subject acquired by a second sensor is indicated by depth information, and a third image obtained from the first image and the second image to correct a correction target pixel included in any of the images, wherein the first sensor and the second sensor are disposed to have fields of view overlapping each other, and the processor identifies a position corresponding to an overlapping portion between the fields of view in the third image as a pixel correction position when the third image is generated by connecting the first image and the second image, and corrects depth information of the pixel correction position using the trained model.

2. The information processing device according to claim 1, wherein the trained model is a model configured to output the third image in which a defect of depth information caused by the overlapping portion between the fields of view has been corrected by learning using the third image having the defect and the pixel correction position as inputs, and the processor performs inference using the trained model with the third image having a defect in depth information caused by the overlapping portion between the fields of view and the pixel correction position as inputs to generate the third image in which the defect has been corrected.

3. An information processing device comprising:

a processor that performs processing using a trained model trained by machine learning on at least a part of a first image in which a subject acquired by a first sensor is indicated by depth information, a second image in which the subject acquired by a second sensor is indicated by depth information, and a third image obtained from the first image and the second image to correct a correction target pixel included in any of the images, wherein the first sensor and the second sensor are disposed to have fields of view overlapping each other, and the processor identifies a position corresponding to an overlapping portion between the fields of view in the first image and the second image as a pixel correction position when the third image is generated by connecting the first image and the second image, and corrects depth information of the pixel correction position using the trained model.

4. The information processing device according to claim 3, wherein the trained model is a model configured to output the first image or the second image in which a defect of depth information caused by the overlapping portion between the fields of view has been corrected by learning using the first image or the second image having the defect and the pixel correction position as inputs, and the processor performs inference using the trained model with the first image or the second image having a defect in depth information caused by the overlapping portion between the fields of view and the pixel correction position as inputs to generate the first image or the second image in which the defect has been corrected, and connects the first image and the second image to generate the third image.

5. An information processing device comprising:

a processor that performs processing using a trained model trained by machine learning on at least a part of a first image in which a subject acquired by a first sensor is indicated by depth information, a second image in which the subject acquired by a second sensor is indicated by depth information, and a third image obtained from the first image and the second image to correct a correction target pixel included in any of the images, wherein the first sensor and the second sensor are disposed to have fields of view not overlapping each other, and the processor identifies a position corresponding to a gap portion between the fields of view in the third image as a pixel correction position when the third image is generated by connecting the first image and the second image, and corrects depth information of the pixel correction position using the trained model.

6. The information processing device according to claim 5, wherein the trained model is a model configured to output the third image in which a defect of depth information caused by the gap portion between the fields of view has been corrected by learning using the third image having the defect and the pixel correction position as inputs, and the processor performs inference using the trained model with the third image having a defect in depth information caused by the gap portion between the fields of view and the pixel correction position as inputs to generate the third image in which the defect has been corrected.

7. An information processing device comprising:

a processor that performs processing using a trained model trained by machine learning on at least a part of a first image in which a subject acquired by a first sensor is indicated by depth information, a second image in which the subject acquired by a second sensor is indicated by depth information, and a third image obtained from the first image and the second image to correct a correction target pixel included in any of the images, wherein the first sensor and the second sensor are sensors having different fields of view, and are arranged to have the fields of view overlapping each other, and the processor identifies a position corresponding to an overlapping portion between the fields of view in the third image as a pixel correction position when the third image is generated by connecting the first image and the second image, and corrects depth information of the pixel correction position using the trained model.

8. The information processing device according to claim 7, wherein the trained model is a model configured to output the third image in which a defect of depth information caused by the overlapping portion between the fields of view has been corrected by learning using the third image having the defect and the pixel correction position as inputs, and the processor performs inference using the trained model with the third image having a defect in depth information caused by the overlapping portion between the fields of view and the pixel correction position as inputs to generate the third image in which the defect has been corrected.

9. The information processing device according to claim 7, wherein the first sensor has the field of view corresponding to a wide angle, and the second sensor has the field of view corresponding to a telephoto.

10. A non-transitory computer readable medium storing a program, the program being executable by a processor to perform operations comprising:

performing processing using a trained model trained by machine learning on at least a part of a first image in which a subject acquired by a first sensor is indicated by depth information, a second image in which the subject acquired by a second sensor is indicated by depth information, and a third image obtained from the first image and the second image to correct a correction target pixel included in any of the images, wherein the first sensor and the second sensor are disposed to have fields of view overlapping each other;

identifying a position corresponding to an overlapping portion between the fields of view in the third image as a pixel correction position when the third image is generated by connecting the first image and the second image; and correcting depth information of the pixel correction position using the trained model.

11. The non-transitory computer readable medium according to claim 10, wherein the trained model is a model configured to output the third image in which a defect of depth information caused by the overlapping portion between the fields of view has been corrected by learning using the third image having the defect and the pixel correction position as inputs, and the operations further comprise performing inference using the trained model with the third image having a defect in depth information caused by the overlapping portion between the fields of view and the pixel correction position as inputs to generate the third image in which the defect has been corrected.

12. An information processing device comprising a processor that performs processing using a trained model trained by machine learning on at least a part of an image indicating a subject, acquired by a sensor including a first light source and a second light source, by depth information, wherein the first light source and the second light source are arranged to have irradiation regions of light overlapping each other, and the processor identifies a position corresponding to an overlapping portion between the irradiation regions in the image as a pixel correction position, and corrects depth information of the pixel correction position using the trained model.

13. The information processing device according to claim 12, wherein the trained model is a model configured to output the image in which a defect of depth information caused by the overlapping portion between the irradiation regions has been corrected by learning using the image having the defect and the pixel correction position as inputs, and the processor performs inference using the trained model with the image having a defect in depth information caused by the overlapping portion between the irradiation regions and the pixel correction position as inputs to generate the image in which the defect has been corrected.

14. An information processing method comprising:

performing, by an information processing device, processing using a trained model trained by machine learning on at least a part of an image indicating a subject, acquired by a sensor including a first light source and a second light source arranged to have irradiation regions of light overlapping each other, by depth information;

identifying, by the information processing device, a position corresponding to an overlapping portion between the irradiation regions in the image as a pixel correction position; and correcting, by the information processing device, depth information of the pixel correction position using the trained model.

15. A non-transitory computer readable medium storing a program for causing a computer to function as an information processing device, the information processing device including a processor that performs processing using a trained model trained by machine learning on at least a part of an image indicating a subject, acquired by a sensor including a first light source and a second light source arranged to have irradiation regions of light overlapping each other, by depth information, the program being executable by the processor to perform operations comprising:

identifying a position corresponding to an overlapping portion between the irradiation regions in the image as a pixel correction position; and correcting depth information of the pixel correction position using the trained model.

\* \* \* \* \*